(12) United States Patent
Sarai et al.

(10) Patent No.: US 7,959,868 B2
(45) Date of Patent: Jun. 14, 2011

(54) EXHAUST GAS PURIFYING APPARATUS

(75) Inventors: Susumu Sarai, Toyota (JP); Seiji Okawara, Toyota (JP)

(73) Assignees: Toyota Jidosha Kabushiki Kaisha, Toyota-shi, Aichi (JP); Emitec Gesellschaft fuer EmissionTechnologie MGH, Lohmar (DE)

( * ) Notice: Subject to any disclaimer, the term of this patent is extended or adjusted under 35 U.S.C. 154(b) by 970 days.

(21) Appl. No.: 11/578,041

(22) PCT Filed: Apr. 12, 2005

(86) PCT No.: PCT/JP2005/007377
§ 371 (c)(1),
(2), (4) Date: Aug. 17, 2007

(87) PCT Pub. No.: WO2005/099867
PCT Pub. Date: Oct. 27, 2005

(65) Prior Publication Data
US 2008/0159923 A1    Jul. 3, 2008

(30) Foreign Application Priority Data

Apr. 12, 2004  (JP) .................. 2004-117189
Apr. 12, 2004  (JP) .................. 2004-117198
Apr. 12, 2004  (JP) .................. 2004-117202
Mar. 10, 2005  (JP) .................. 2005-067849

(51) Int. Cl.
*B01D 50/00*    (2006.01)
(52) U.S. Cl. ...................................... 422/180
(58) Field of Classification Search .......... 422/171, 422/177, 180; 502/439, 527
See application file for complete search history.

(56) References Cited

U.S. PATENT DOCUMENTS

| 4,665,051 A * | 5/1987 | Nonnenmann ............... 502/439 |
| 5,157,007 A | 10/1992 | Domesle et al. |
| 5,746,989 A | 5/1998 | Murachi et al. |
| 5,820,832 A * | 10/1998 | Huttenhofer et al. ......... 422/171 |
| 5,908,480 A | 6/1999 | Ban et al. |
| 6,534,021 B1 * | 3/2003 | Maus ............................ 422/180 |
| 2002/0170433 A1 | 11/2002 | Pfeifer et al. |
| 2004/0013580 A1 | 1/2004 | Bruck et al. |
| 2004/0043899 A1 | 3/2004 | Mangold et al. |

FOREIGN PATENT DOCUMENTS

| DE | 37 44 265 A1 | 7/1989 |
| DE | 201 17 873 U1 | 3/2002 |

(Continued)

OTHER PUBLICATIONS

Japanese Office Action dated Dec. 2, 2008.

(Continued)

*Primary Examiner* — Tom Duong
(74) *Attorney, Agent, or Firm* — Finnegan, Henderson, Farabow, Garrett & Dunner, LLP

(57) ABSTRACT

An exhaust gas purifying apparatus is comprised of a plurality of exhaust gas passages, and a filter body 3 installed in the exhaust gas passages. The exhaust gas passage contains a filter-conducting portion 100 of conducting the exhaust gas to the filter body 3, and a filter-bypassing portion 200 of bypassing the filter-conducting portion 100 by branching out to an exhaust gas passage adjacent from the filter-conducting portion 100. When PMs are deposited on the filter-conducting portion 100 and an exhaust gas pressure loss is increased, the exhaust gas is branched out from the filter-bypassing portion 200 to flow.

26 Claims, 16 Drawing Sheets

FOREIGN PATENT DOCUMENTS

| | | |
|---|---|---|
| JP | 4-53448 | 5/1992 |
| JP | 6-1236 | 1/1994 |
| JP | 9-53442 | 2/1997 |
| JP | 09-068032 | 3/1997 |
| JP | 9-173866 | 7/1997 |
| JP | 9-262414 | 10/1997 |
| JP | 9-262415 | 10/1997 |
| JP | 11-93643 | 4/1999 |
| JP | 2000-199423 | 7/2000 |
| JP | 2000-508585 | 7/2000 |
| JP | 2000-218117 | 8/2000 |
| JP | 2001-241316 | 9/2001 |
| JP | 2002-113798 | 4/2002 |
| JP | 2003-001059 | 1/2003 |
| JP | 2003-500200 | 1/2003 |
| JP | 2003-35129 | 2/2003 |
| JP | 2003-278524 | 10/2003 |
| JP | 2005-507315 | 3/2005 |
| RU | 2 022 643 | 11/1994 |
| WO | WO 01/12301 A1 | 2/2001 |

OTHER PUBLICATIONS

Indian Office Action dated Apr. 9, 2009.

Brück, R. et al., "Metal Supported Flow-Through Particulate Trap; a Non-Blocking Solution," SAE Technical Paper Series, 2001-01-1950, 13 sheets, (May 7-9, 2001).

Diefke, F. et al., "New Diesel Catalyst Systems to Achieve European 2005 Legislation-Tested on A Volvo S60 Passenger Car," 24th International Vienna Motor Symposium 2003, 13 sheets, (2003).

Saroglia, G. et al., "Application of New Diesel Aftertreatment Strategies on a Production 1.9 L Common-Rail Turbocharged Engine," 2002-01-1313, Society of Automotive Engineers, Inc., 8 sheets, (2002).

* cited by examiner

Exhaust Gas

Exhaust Gas

Exhaust Gas

EXHAUST GAS PURIFYING APPARATUS

CROSS REFERENCE TO RELATED APPLICATIONS

This application is a national phase application of International Application Number PCT/JP2005/007377, filed Apr. 12, 2005, and claims the priority of Japanese Patent Application Nos. 2004-117189, filed Apr. 12, 2004; 2004-117198, filed Apr. 12, 2004; 2004-117202, filed Apr. 12, 2004; and 2005-067849, filed Mar. 10, 2005, the content of all of which is incorporated herein by reference.

TECHNICAL FIELD

The present invention is related to an exhaust purifying apparatus for collecting particulate matters (will be referred to as "PMs" hereinafter) contained in exhaust gas exhausted from diesel engines, and the like, so as to purify the exhaust gas.

TECHNICAL BACKGROUND

Since particulate matters (PMs) which are made of carbon fine particles, SOF (Soluble organic Fraction), sulfate, and the like are contained in exhaust gas exhausted from diesel engines, these PMs must be removed from the exhaust gas in order to exhaust purified exhaust gas. Since the PMs can be hardly removed by the normal oxidizing catalyst, 3-way catalyst, and the like, generally speaking, after the PMs are collected by filters (DPFs) and oxidized to be removed.

As such a DPF, wall flow type DPFs have been widely utilized. In one wall flow type DPF, an inlet-side cell clogged at a downstream-side edge portion, and also an outlet-side cell clogged at an upstream-side edge portion and located adjacent to the inlet-side cell have been formed in a honeycomb body. This honeycomb body owns a large number of cells, and is made of thermal resistant ceramics such as cordierite. In this DPF, exhaust gas which has entered to the inlet-side cell passes through a cell wall and then is exhausted from the outlet-side cell. While the exhaust gas passes through the cell wall, the PMs are collected in pores of the cell wall. Thereafter, when certain amounts of the PMs are collected, the collected PMs are burned by heating these PMs by a heater, so that the DPF function may be reproduced.

However, in such DPFs, heat generation amounts are increased by the combustion when the DPF functions are reproduced in such a case that PM collecting amounts are large. Thus, there are some possibilities that these DPFs are damaged by heat shock. Also, manufacturing cost as to such DPFs is high. As a consequence, several ideas as to DPFs made of metals have been recently proposed.

For instance, JP-A-9-262414 describes such a DPF in which while a corrugate plate made of a metal thin plate and a plain plate made of metal non-woven cloth are alternately stacked with each other, both an inlet-side cell clogged at a downstream-side edge portion and an outlet-side cell clogged at an upstream-side edge portion and located adjacent to the inlet-side cell are formed. Also, JP-A-2002-113798 describes such a DPF in which while a corrugate plate and a plain plate made of metal non-woven cloth are alternately stacked with each other, both an inlet-side cell clogged at a downstream-side edge portion and an outlet-side cell clogged at an upstream-side edge portion and located adjacent to the inlet-side cell are formed.

In accordance with these DPFs, PMs contained in exhaust gas are collected into the metal non-woven cloth. Then, even when the reproducing process operations for burning the PMs by heating manners are carried out, since the DPFs is made of metal, heat shocks are low and damages can be suppressed. However, since any of these DPFs correspond to the wall flow type DPFs, exhaust gas pressure losses are increased in connection with collecting of the PMs. Moreover, since the PMs are concentrated to be deposited in the vicinity of the clogging portions of the inlet-side cells, there is such a problem that the exhaust gas pressure losses are increased rapidly. In the case that engine efficiencies, fuel consumption, and the like constitute major factors, the reproducing process operations must be frequently carried out.

On the other hand, German Utility Model NO. 20,117,873 U1 discloses a filter in which a corrugate plate made of a metal foil and a filter layer are alternately stacked with each other; a plurality of nail-shaped holes having nail-shaped heights are formed in the corrugate plate; the plural nail-shaped holes form a passage which has an inner-directed nail-shaped hole and an outer-directed nail-shaped hole; the inner-directed nail-shaped hole and the outer-directed nail-shaped hole are arranged in such a manner that these nail-shaped holes define an angle; heights of the nail-shaped holes are equal to 100% to 60% of a structural height; and at least 20% of a flow free degree is guaranteed.

In accordance with this filter, exhaust gas derived from the nail-shaped holes pass through the filter layer, so that PMs are collected by the filter layer. Also, since this filter is mainly formed by way of the straight flow structure, increasing of the exhaust gas pressure loss may also be suppressed. Then, since this filter is made of the metal, there is no damage due to thermal stress. However, in this filter, when the depositions of PMs on both the filter layer and the portions of the nail-shaped holes are progressed, the passage of the exhaust gas is blocked, so that the exhaust gas pressure loss is rapidly increased. As a result, since the amount of the collectable PMs cannot be increased, there is a drawback that the PM collecting efficiency must be lowered.

Also, filter catalyst to which catalyst functions have been applied has been developed. For example, JP-A-9-262415 describes the following filter element. That is, a plain plate filter and a corrugate plate are alternately overlapped with each other, and then, the overlapped filter/corrugate plate is wound so as to construct a pillar-shaped body. Then, both edges of this pillar-shaped body are alternately filled to constitute the filter element. The plain plate filter is manufactured by that either ceramics or a metal is filled into either a 3-dimensional mesh-shaped structural porous body or holes of this porous body so as to essentially reduce diameters of these holes. The 3-dimensional mesh-shaped structural porous body is made of a thermal resistant metal and owns a continuously evacuated hole. In this filter element, the catalyst metal is carried on either the corrugate plate or the plain plate element.

In accordance with this filter element, the PM trap and the catalyst converter can be formed in an integral body, resulting in a spatial saving merit. Also, since the carrier member is made of the metal, the heat capacity is small, the temperature increasing speed of the catalyst metal is increased, and such a temperature required for effectively actuating the catalyst metal can be easily obtained. Furthermore, in such a case that such a $NO_x$ sorbing material as an alkali metal is carried as the catalyst metal, the below-mentioned merit may be obtained. That is, if a base is made of cordierite or the like, then this base may be reacted with the $NO_x$ sorbing material. However, if a base is made of a metal, then this metal base may not be reacted with the $NO_x$ sorbing material.

However, in accordance with the technical idea disclosed in JP-A-9-262415, since the 3-dimensional mesh-shaped structural porous body is employed which is made of the thermal resistant metal and has the continuously evacuated hole, the diameters of the holes are made random. In order to carry catalyst, it is effective to form such a catalyst layer containing a porous oxide which has carried a catalyst metal. However, it is practically difficult to form a uniform catalyst layer on the 3-dimensional mesh-shaped structural porous body made of the heat resistant metal, the hole diameters of which are made random. There are various problems. That is, the exhaust gas pressure loss is largely increased, activity caused by the catalyst metal cannot be sufficiently obtained, and grains of the catalyst metal are grown due to heat produced when the filter element is used, so that the activity is lowered.

For instance, JP-A-2001-241316 discloses an exhaust gas purifying apparatus in which one pair of DPFs are arranged in a series manner, and such a DPF having a straight passage, both ends of which are not clogged, is arranged on the upstream side. In accordance with this exhaust gas purifying apparatus, since a portion of the exhaust gas is directly entered from the straight passage to the DPF of the downstream side, this DPF of the downstream side is quickly heated, so that the PMs collected by the DPF of the downstream side can be burned. As a consequence, while the collecting efficiency of the PMs is not lowered, the combustion efficiency of the PMs can be improved and the combustion of the PMs can be finished within a short time.

Moreover, in the recent year, as described in, for example, JP-A-9-173866, a continuous reproducing type DPF (filter catalyst) has been developed, in which a coat layer made of alumina is formed on a surface of a cell wall of the DPF, and such a catalyst metal a platinum (Pt) is carried in this coat layer. In accordance with this continuous reproducing type DPF, since the collected PMs are oxidized/burned due to catalyst reactions width the catalyst metal, the PMs are burned at the same time when the PMs are collected, or the PMs are continuously burned while the PMs are collected, so that the DPF can be reproduced. Then, since the catalyst reaction may occur at a relatively low temperature and the PMs can be burned under such a condition that the collecting amount of the PMs is small, there are such merits that the thermal stress applied to the DPF is small and the failure of the DPF can be avoided.

Also, JP-A-9-053442 describes an exhaust gas purifying apparatus in which an oxidizing catalyst having the straight flow structure, the above-described filter catalyst, and $NO_x$ sorbing-and-reducing catalyst having the straight flow structure are arranged from an upstream side of exhaust gas in this order. As previously explained, since either oxidizing catalyst or the $NO_x$ sorbing-and-reducing catalyst is combined with the filter catalyst, the purifying performance as to the PMs and $NO_x$ may be improved. For example, such a difficulty may be suppressed. That is, the PMs which are entered to the filter catalyst are oxidized by the oxidizing catalyst on the upstream side and the entered PMs are brought into very fine particles. In this way, the problem that the particles are deposited on the edge plane of the filter catalyst so that the filter catalyst is blocked, can be avoided. Also, since the temperature of the exhaust gas is increased due to the oxidization reaction by the oxidizing catalyst, or $NO_2$ having high oxidation activity is produced, the oxidation of the PMs is emphasized and the purification performance as to $NO_x$ may be improved.

In addition, another exhaust gas purifying apparatus is known in which while urea-$NO_x$-selective-reducing catalyst is employed and urea is added into the exhaust gas, $NO_x$ is reduced so as to be purified by either urea or produced ammonia by way of the urea-$NO_x$-selective-reducing catalyst. Since this urea-$NO_x$-selective-reducing catalyst is combined with the filter catalyst, HC, CO, and PMs can be oxidized so as to be purified, and $NO_x$ can be reduced so as to be purified.

However, in the technical idea described in JP-A-2001-241316, in such a case that the exhaust gas in the low temperature range is continuously entered, it is not possible to avoid such a fact that the PMs are deposited on the upstream-side edge plane of the filter catalyst. Thus, there are some possibilities that the exhaust gas pressure loss is increased since the edge plane is blocked. Also, in the filter catalyst, the coat amount of the catalyst layer is limited in order to avoid increasing of the exhaust gas pressure loss. Under such a temperature condition that the filter catalyst is exposed to higher temperatures than, or equal to approximately 600° C., there are some possibilities that since the particles of Pt are grown, the purifying performance is lowered.

Also, in the case of diesel vehicles, reducing agent such as light oil is added to exhaust gas in an intermittent manner so as to increase reducing performance with respect to $NO_x$. As a consequence, in the case that the technical idea described in JP-A-9-053442 is applied to this system, since the reducing agent is partially oxidized by the oxidizing catalyst of the upstream side, the gasification of this reducing agent may be progressed, and it may be expected that the purifying performance as to $NO_x$ may be improved. However, in order to achieve this effect by the oxidizing catalyst, the length of the oxidizing catalyst must be made long. If this length of the oxidizing catalyst is made long, then there is such a problem that the oxidizing performance as to the PMs is lowered, since the filter catalyst is arranged at such a position located far from the diesel engine on the downstream side.

Then, in the exhaust gas purifying apparatus using the urea-$NO_x$-selective-reducing catalyst, since $NO_x$ can be hardly reduced in the upstream portion of the urea-$NO_x$-selective-reducing catalyst, the dimension of this urea-$NO_x$-selective-reducing catalyst must be made bulky. Also, in such a case that the urea-$NO_x$-selective-reducing catalyst is combined with the filter catalyst, since the temperature of the exhaust gas cannot be increased in the urea-$NO_x$-selective-reducing catalyst, there are such problems that this combination owns a demerit as to the temperature increase, and the oxidizing activity as to the PMs is low.

PROBLEM TO BE SOLVED BY THE INVENTION

The present invention has been made to solve the above-described problems, and has such an object that an improvement in a PM collecting efficiency is compatible with a suppression of increasing of an exhaust gas pressure loss. Also, the present invention has another object to provide a compact exhaust gas purifying apparatus capable of continuously and effectively oxidizing/burning collected PMs.

MEANS FOR SOLVING PROBLEM

An exhaust gas purifying apparatus capable of solving the above-described problems, according to the present invention, is featured by such an exhaust gas purifying apparatus comprising a semi-filter-structured body comprising a plurality of exhaust gas passages, and a filter body provided in the exhaust gas passages, wherein; the exhaust gas passages comprise a filter-conducting portion of conducting an exhaust gas to the filter body, and a filter-bypassing portion of bypassing the filter-conducting portion by branching out to an exhaust gas passage adjacent to the filter-conducting portion.

An exhaust gas purifying apparatus made by further embodying this exhaust gas purifying apparatus is featured by that the semi-filter-structured body is structured by that a corrugate plate of a metal thin plate having hill portions and valley portions alternately neighboring each other in a direction of crossing an exhaust gas flow direction and a gas transmittable plain plate composed of the filter body are alternately stacked; the hill portion has a concave intermediate valley portion structured by lowering a height of a hill thereof, and the intermediate valley portion structures the filter-bypassing portion comprising a branching portion that enables the exhaust gas to flow from a neighboring valley portion, and an opening that enables the exhaust gas to flow in a downstream one of the hill portions; the valley portion has a convex intermediate hill portion structured by lowering a depth of a valley thereof; the filter-conducting portion is structured by the intermediate hill portion, both of the hill portions adjacent to the valley portion, and the plain plate contacting the hill portions; and in the case that a pressure in the filter-conducting portion is increased, at least a part of the exhaust gas flowing on the valley portion flows in a neighboring hill portion through the branching portion.

In this case, it is preferable that the hill portion is opposite the filter-conducting portion through the plain plate.

Also, if the feature of this exhaust gas purifying apparatus is expressed from a rear side of the corrugate plate, then the following structure is defined. That is, the semi-filter-structured body is structured by that a corrugate plate of a metal thin plate having hill portions and valley portions alternately neighboring each other in a direction of crossing an exhaust gas flow direction and a gas transmittable plain plate composed of the filter body are alternately stacked; the valley portion has a convex intermediate hill portion structured by lowering a depth of a valley thereof; the intermediate hill portion structures the filter-bypassing portion comprising a branching portion that enables the exhaust gas to flow from a neighboring hill portion, and an opening that enables the exhaust gas to flow in a downstream one of the valley portions; the hill portion has a concave intermediate valley portion structured by lowering a height of a hill thereof; the filter-conducting portion is structured by the intermediate valley portion, both of the valley portions adjacent to the hill portion; the plain plate contacting the valley portions; and in the case that a pressure in the filter-conducting portion is increased, at least a part of the exhaust gas flowing on the hill portion flows in a neighboring valley portion through the branching portion.

In this case, it is preferable that the valley portion is opposite the filter-conducting portion through the plain plate.

It is preferable that both the intermediate valley portion and the intermediate hill portion are formed by deforming the hill portion or the valley portion, and a height of a hill of the intermediate hill portion or a depth of the intermediate valley portion gradually lowers toward a downstream end thereof.

Also, an open area of the corrugate plate in the filter-conducting portions estimated by a plan view is more than or equal to 30% of a total open area of the corrugate plate estimated by a plan view. A total volume of the filter-conducting portions is more than, or equal to 50% of a total volume of the hill portions and the valley portions.

Furthermore, it is preferable that a catalyst layer comprising an oxidizing catalyst and an oxide support has been formed in, at least, one of the exhaust gas passage and the filter body.

EFFECT OF THE INVENTION

In accordance with the exhaust gas purifying apparatus of the present invention, when PMs are deposited on the filter-conducting portion of the semi-filter-structured body and an exhaust gas pressure loss is increased, the exhaust gas flow from the filter-bypassing portion bypassing the filter-conducting portion by branching out to an exhaust gas passage adjacent to the filter-conducting portion, and the exhaust gas is distributed up to the outlet-side edge portion while this exhaust gas passes through the filter-bypassing portion and sequentially detours the filters. As a result, increasing of the exhaust gas pressure loss can be suppressed.

Then, the filter body defined from the filter-conducting portion to the filter-bypassing portion can be employed so as to collect the PMs, and thus, the large area of the filter body can be used in order to collect the PMs, so that the PMs can be effectively collected. As a consequence, the operation time until the reproducing process operation for burning the collected PMs can be prolonged.

BEST MODE FOR CARRYING OUT THE INVENTION

Figure 1:
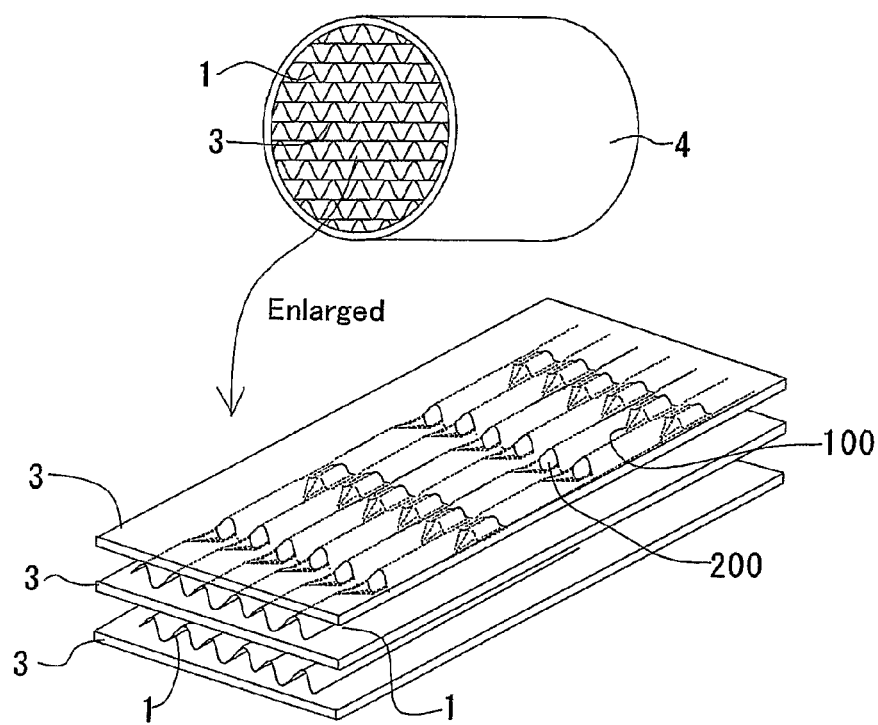
FIG. 1 is a perspective view and an enlarged perspective views, which show an exhaust gas purifying apparatus of an embodiment 1 and a major portion thereof.

The exhaust gas purifying apparatus of the present invention is constituted by such a semi-filter structural body which has both a plurality of exhaust gas passages, and a filter body installed in the exhaust gas passages, in which the exhaust gas passage is comprised of: a filter-conducting portion of conducting exhaust gas to the filter body; and a filter-bypassing portion of bypassing the filter-conducting portion by branching out to an exhaust gas passage adjacent to the filter-conducting portion.

The filter body is capable of collecting the PMs and owns a gas permeability, while porous ceramics and a fiber integrated body may be employed as this filter body. Since this filter body is arranged in the exhaust gas passage, the filter-conducting portion can be formed, and since the hole which is communicated with the adjoining exhaust gas passage is formed in the exhaust gas passage provided on the upstream side, the filter-bypassing portion can be formed. As a specifically preferable embodiment mode, it is preferable to constitute a semi-filter-structured body having a honeycomb shape by alternately stacking a corrugate plate having no gas permeability and a filter body having a plain plate shape with each other.

More specifically, as such a semi-filter-structured body, the semi-filter-structured body recited in Claim 3, or Claim 15 may be preferably employed. In the exhaust gas purifying apparatus (semi-filter-structured body) recited in Claim 3, the exhaust gas which is entered into the passage formed by the valley portion and the upper-side plain plate collides with the intermediate hill portion, passes through the upper-side plain plate (filter body) having the gas transmission characteristic, and then, the PMs are collected by the plain plate. Then, when the PM collecting amount of the upper-side plain plate is increased, since pressure within the filter-conducting portion is increased, the exhaust gas flows from the filter-conducting portion through the branching portion of the upstream-side filter-bypassing portion, and the exhaust gas is branched to be entered from the intermediate valley portions of the both-side hill portions via the opening to the both-side hill portions.

Then, as recited in Claim 15, on the side of the rear plane of the corrugate plate, the rear plane side of the intermediate valley portion becomes the convex shape, so that the filter-conducting portion is formed between the hill portion and the lower-side plain plate, and the filter-bypassing portion is formed in the intermediate hill portion of this upstream-side valley portion. As a result, the exhaust gas which is entered into the passage formed by the hill portion and the lower-side plain plate collides with the intermediate valley portion. In the case that pressure within the filter-conducting portion is increased, the exhaust gas flows from the filter-conducting portion and passes through the branching portion of the upstream-side filter-bypassing portion, and then, is branched to be entered via the openings of the intermediate hill portions of the both-side valley portions into the both-side valley portions.

This operation is continuously repeated from the exhaust gas inlet-side edge plane to the outlet-side edge plane.

In other words, since the exhaust gas purifying apparatus of the present invention is basically arranged by such a wall flow structure that exhaust gas passes through a filter body, a collecting efficiency of PMs is high. Then, even when the PM collecting amount of the plain plate in the filter-conducting portion is increased, the exhaust gas is branched from the upstream-side filter-bypassing portion and is entered into either the hill portion or the valley portion, which may continuously occur. As a consequence, rapid increasing of the exhaust gas pressure loss caused by the depositions of the PMs does not occur. Also, since the major portion of the plain plate can be utilized so as to collect the PMs, increasing of the exhaust gas pressure loss can be effectively suppressed.

The corrugate plate has been formed from the metal thin plate, and may be preferably manufactured by performing a corrugate processing operation, and the like. There is no specific restriction as to a material of this corrugate plate if this material may have a thermal resistant characteristic, which can withstand temperatures of exhaust gas, and heat produced during reproducing process operation. Stainless steel is desirably employed. Also, in the case that this corrugate plate is used in an automobile, a thickness range thereof is preferably defined from 20 μm to 110 μm, more specifically, suitably defined from 40 μm to 80 μm.

While the plain plate functioning as the filter body corresponds to such a member having a gas transmission characteristic, such members may be employed as the filter body, namely, a metal plate into which holes capable of flowing inlet/rear surfaces of this metal plate have been formed, and a plain plate on which thermal resistant fiber has been integrated. As to the plain plate in which the thermal resistant fiber has been integrated, the thermal resistant fiber may be formed from non-woven fabric cloth and woven fabric cloth such as metal fiber, ceramics fiber, metal whiskers, and ceramics whiskers. In order that the improvement in the PM collecting efficiency is compatible with the suppression of increasing of the exhaust gas pressure loss as the automobile-purpose exhaust gas purifying apparatus, diameters of fiber are preferably selected to be approximately 15 to 60 μm, and integrated amounts are preferably selected to be 300 to 1000 g/m$^2$.

In order to arrange the exhaust gas purifying apparatus (semi-filter-structured body) of the present invention, a corrugate plate and a plain plate may be alternatively and alternately stacked with each other to be inserted into a predetermined outer cylinder. Alternatively, a corrugate plate having a predetermined length and a plain plate may be overlapped with each other so as to be wound in a roller shape, and then, the roller-shaped filter structural body may be inserted into a predetermined outer cylinder. It should be noted that corrugate plates may be alternatively stacked with plain plates in such a manner that these corrugate plates may be directed to the same direction, and may become the same phase in all of the layers, or may be alternatively stacked in such a manner that these corrugate plates are alternately directed to different directions by 180 degrees, or phases thereof may be different from each other. However, in the case that the filter-conducting portion has been formed in the valley portion, it is preferable that the hill portion of the adjacent corrugate plate is present on the opposite side via the plain plate, whereas in the case that the filter-conducting portion has been formed in the hill portion, it is preferable that the valley portion of the adjacent corrugate plate is present on the opposite side via the plain plate. As a result, flows of the exhaust gas which has penetrated the plain plate are not disturbed, so that the PM collecting efficiency may be further improved, and increasing of the exhaust gas pressure loss may be further suppressed.

Either the intermediate valley portion or the intermediate hill portion is formed by deforming either the hill portion or the valley portion, and may be preferably smoothly continued toward the bottom portion or the top portion. In other word, preferably, either the intermediate valley portion or the intermediate hill portion may have such an inclined plane, the height of which is gradually lowered, or is gradually increased toward the downstream side. With employment of such a construction, since a vector directed to the plain plate for partitioning the filter-conducting portion is produced in the exhaust gas present in the filter-conducting portion, the PM collecting efficiency may be further improved.

Preferably, an opening area of the corrugate plate, as viewed in a plane, in the filter-conducting portion is larger than, or equal to 30% of a total opening area of the corrugate plate as viewed in the plane. If the opening area of the corrugate plate, as, viewed in a plane, in the filter-conducting portion is smaller than 30% of the total opening area, than the utilization area of the plain plate is lowered, so that the PM collecting efficiency is lowered. Also, preferably, a total capacity of the filter-conducting portion is larger than, or equal to 50% of a total capacity as to both the hill portion and the valley portion. If this ratio becomes smaller than 50%, then the PM collecting efficiency is lowered.

Further, the longer the distance from the filter-conducting portion up to the upstream-side branching portion thereof becomes, the higher the PM collecting efficiency is increased. To the contrary, the exhaust gas pressure loss may be easily increased. As a consequence, this distance must be set to an optimum distance value.

However, when various sorts of experiments have been carried out for practical utilization, the following fact could be revealed. In the above-explained exhaust gas purifying apparatus, in such a case that exhaust gas containing PMs in high concentration was entered therein for a long time depending upon driving condition, there are some possibilities that a large amount of PMs were deposited on the inlet-side edge plane. As explained above, when the large amount of the PMs are deposited on the inlet-side edge plane, not only the exhaust gas pressure loss may be increased, but also if the PMs are ignited under high temperature condition, even when this PM deposition amount is smaller than, or equal to an allowable limit amount, the temperature is rapidly and locally increased. Therefore, there is a risk that a failure such as a melting loss may happen to occur.

As a consequence, preferably, the filter-bypassing portion of the uppermost stream is provided on an upstream side with respect to the filter-conducting portion of the uppermost stream, and is opened to an edge plane of an exhaust gas inlet side. With employment of such a structure, since the exhaust gas firstly passes through the filter-bypassing portion of the uppermost stream, the depositions of the PMs with respect to the exhaust gas inlet-side edge plane can be suppressed, and blocking of the edge plane is prevented. As a consequence, the passage opening of the inlet-side edge plane can be always kept large, increasing of the exhaust gas pressure loss can be suppressed, and further, melting losses caused by the excessively increased temperatures can be avoided. Although the PM collecting efficiency is lowered in a microscopic view, all of the exhaust gas passages always can function in an effective manner, so that the entire collecting efficiency can be maintained in a higher efficiency, and thus, the entire PM collecting efficiency may be improved.

The filter-bypassing portion of the uppermost stream may be constituted by a hill portion having both an upstream-side opening and a downstream-side opening; a valley portion which is continued to the downstream-side opening; and a turned intermediate valley portion, the depth of which is gradually lowered, and which is continued to a hill portion of the downstream side. In this case, the exhaust gas is firstly entered from the upstream-side edge plane to the hill portion, and the exhaust gas flowed from the hill portion is entered from the valley portion into the turned intermediate valley portion. Since the turned intermediate valley portion is continued to the hill portion on the downstream side, an upper plane of a tip portion has been blocked by the plain plate. However, even when PMs are deposited on this portion, there is a space between the turned intermediate valley portion and the plain plate up to a halfway of this turned intermediate valley portion, and thus, the exhaust gas is branched to be entered from this space to the both-side valley portions. As a consequence, both the hill portion and the turned intermediate valley portion may function as the filter-bypassing portion.

Alternatively, the most upstream filter-bypassing portion may be constituted by a valley portion having a turned intermediate hill portion that is open at an upstream side thereof, and a height of a hill of the turned intermediate hill portion gradually lowers in a downstream direction, and the turned intermediate hill portion continues to a downstream one of the valley portions. In this case, the exhaust gas is firstly entered to the valley portion, and subsequently, is entered to the turned intermediate hill portion. Since a ceiling portion is continued to the valley portion in the turned intermediate hill portion, a tip portion has been blocked by the plain plate on the side of a rear plane. However, even when PMs are deposited on this portion, there is a space between the turned intermediate hill portion and the plain plate up to a halfway of this turned intermediate hill portion, and thus, the exhaust gas is branched to be entered from this space to the both-side hill portions. As a consequence, both the valley portion and the turned intermediate hill portion may function as the filter-bypassing portion.

Furthermore, the filter-bypassing portion of the uppermost stream may be structured by a hole that a particulate matter in the exhaust gas can be passed through, and the hole is formed on the plain plate stacked beneath the corrugate plate and is opposite the hill portion of the corrugate plate. Alternatively, the filter-bypassing portion of the uppermost stream may be made as a notch portion, through which a particulate matter contained in the exhaust gas can be passed through, and which is formed on the plain plate at a position opposite to the hill portion stacked on the lower side of the corrugate plate. In this case, the exhaust gas is firstly entered into the hill portion, and is entered via either the hole or the notch portion to the exhaust gas passage of the corrugate plate stacked via the plain plate on the lower side even when PMs are deposited on the downstream-side filter-conducting portion. Accordingly, both the hole and the notch portion may function as the filter-bypassing portion.

In the exhaust gas purifying apparatus of the present invention, the catalyst layer is preferably formed and collected PMs are actively oxidized and burned. However, if the catalyst layer is formed on the filter body, then the air passing resistance of the filter body is increased, so that the exhaust gas pressure loss is increased. As a consequence, the filter body may be preferably constituted by a hole passing from a side to an other side, and a catalyst layer comprising a catalyst metal, and a porous oxide, and the hole is shrunk or filled up to be a size thereof to be less than or equal to 200 μm by the catalyst layer.

Since the hole is shrunk or filled up by the catalyst layer in such a manner that the diameter thereof is less than or equal to 200 μm, the PMs contained in the exhaust gas can be collected by the catalyst layer formed on the hole. Then, since the catalyst layer has been formed on the metal plate, the catalyst layer can be uniformly formed, and also, since the catalyst layer can be uniformly heated by the exhaust gas and the catalyst metal can also be uniformly activated, the collected PMs can be effectively oxidized/burned. Also, since the catalyst layer becomes uniform, the thickness of this catalyst layer can be made thin. As a result, increasing of the exhaust gas pressure loss can be suppressed.

In the case that the reduced diameter of the hole is equal to 200 μm, there are some PMs which may pass through the holes having the diameters of 200 μm under initial condition. However, when the PMs are adhered to the holes, the hole diameters may become approximately 10 to 50 μm, so that the PM collecting capability may be improved. As a result, the hole diameter has been made less than or equal to 200 μm. It should be noted that since the catalyst layer contains the porous oxide powder, pores having diameters of approximately 10 μm are also present in the catalyst layer itself, and very fine holes are similarly present in the porous oxide powder. As a consequence, even when the holes are completely filled up by the catalyst layer, the gas diffusion characteristic can be maintained, and the PMs which have been collected in the catalyst layer formed in the holes can be effectively oxidized/burned by the catalyst metal.

The filter body is equipped with holes which flow through inlet/rear planes thereof. A dimension of this hole may be preferably selected to be 30 to 500 μm. If a dimension of a hole exceeds 500 μm, then this dimension can be hardly made smaller than, or equal to 200 μm by the catalyst layer. If a dimension of a hole is smaller than 30 μm, then this hole is blocked by the catalyst layer. As a result, although the gas distributing characteristic is maintained, the exhaust gas pressure loss may be easily increased. There is no specific limitation as to a total number of these holes. Preferably, these holes are provided as large as possible within such a range that strength of the filter body can be maintained.

A catalyst layer corresponds to such a layer containing a porous oxide to which a catalyst metal has been carried. This catalyst layer is formed at least on the filter body, and may be preferably formed in the entire semi-filter-structured body. This catalyst layer may be preferably formed in such an amount of 30 to 200 g per 1 liter of the semi-filter-structured body. If the amount of this catalyst layer is smaller than 30 g, then the catalyst metal is carried in high density. As a result, grain growth may be produced in the catalyst metal, and the PM collecting efficiency is lowered. On the other hand, if the amount of the catalyst layer becomes larger than 200 g, then the exhaust gas pressure loss is increased.

As the porous oxide, at least one sort of alumina, zirconia, titania, and ceria may be selected. Alternatively, such a composite oxide may be employed which are made of plural sorts of the above-explained oxides. As the catalyst metal, one sort, or plural sorts of noble metals belonging to the platinum group such as Pt, Rh, Pd, Ir, and Ru may be preferably employed. If a carry amount of the catalyst metal is smaller than 0.1 to 5 g of 1 L of the semi-filter-structured body, then activity becomes excessively low and this carry amount cannot be practically used. To the contrary, even if a carry amount of catalyst metal is larger than 0.1 to 5 g, then activity is saturated and manufacturing cost thereof is increased.

Preferably, a $NO_x$ sorbing material which is selected from an alkali metal, an alkaline-earth metal, and a rare earth metal may be contained in the catalyst layer. If the $NO_x$ sorbing material is contained in the catalyst layer, then $NO_2$ produced by the oxidation by the catalyst metal can be sorbed in the $NO_x$ sorbing material, so that $NO_x$ can be further purified. It is desirable to set a carry amount of the $NO_x$ sorbing material within a range between 0.05 mol and 0.45 mol per 1 liter of the semi-filter-structured body. If a carry amount of the $NO_x$ sorbing material is smaller than this range, then activity becomes excessively low and this carry amount cannot be practically used. To the contrary, if a carry amount of the $NO_x$ sorbing material is larger than this range, then the $NO_x$ sorbing material covers the catalyst metal and activity is lowered.

In order to form the catalyst layer, either oxide powder or composite oxide powder are processed in combination with a binder component such as an alumina sol and water so as to obtain a slurry. After this slurry is adhered to at least the plain plate, the resultant carrier layer may be sintered, and thereafter, a catalyst metal may be carried in this sintered carrier layer. Alternatively, a slurry may be produced from such a catalyst powder that a catalyst metal has previously been carried in either the oxide powder or the composite oxide powder. In order to adhere the slurry, the normal dipping process may be employed. However, it is desirable that the slurry is forcibly filled into the holes by way of either air blow or air suction, and an extra slurry portion entered in the holes is removed.

Also, a semi-filter-structured body may be alternatively formed. That is, the semi-filter-structured body is structured by that a corrugate plate of a metal thin plate having a first hill portions and a first valley portions alternately neighboring each other and a plain plate are alternately stacked, and comprises a first passage structured by the first hill portion and the plain plate beneath the corrugate plate; a first filter-conducting portion structured by a second valley portion that is formed on the first passage and inclines upward along a downstream direction and the plain plate over the corrugate plate; a first filter-bypassing portion structured by the second valley portion and the plain plate beneath the corrugate plate; a second passage structured by the first valley portions neighboring the first passage and the plain plate over the corrugate plate; a second filter-conducting portion structured by a second hill portion that is formed on the second passage and inclines downward along a downstream direction and the plain plate beneath the corrugate plate; and a second filter-bypassing portion structured by the second hill portion and the plain plate over the corrugate plate; and wherein: a depth of a bottom portion of the second valley portion is smaller than a height of a top of the first hill portion; and a height of a top of the second hill portion is smaller than a depth of a bottom portion of the first valley portion. Also, in this case, the hole is formed at least in the plain plate.

In this case, the corrugate plates may be alternatively stacked with each other these corrugate plates are directed to the same direction and the same phase in all of layers. Alternatively, these corrugate plates may be alternately stacked with each other in such a manner that these corrugate plates are alternately directed opposite to each other at an angle of 180 degrees, or the phases thereof are different from each other. In other words, when the semi-filter-structured body is cut at a sectional plane perpendicular to the exhaust gas flow direction, both the first passage and the second passage may be located at the same sectional plane, or may be located at the different sectional plane. However, it is preferable that a concave portion of an adjoining corrugate plate is present at an opposite position via the plain plate of the filter-conducting portion. As a result, flowing of the exhaust gas which has penetrated the plain plate is not distributed, the PM collecting efficiency may be further improved, and also, increasing of the exhaust gas pressure loss may be further suppressed.

It should also be understood that the concave portion of the adjoining corrugate plate implies any one of the first hill portion and the second hill portion in such a case that the adjoining corrugate plate is positioned upwardly, whereas the concave portion of the adjoining corrugate plate implies any one of the first valley portion and the second valley portion in such a case that the adjoining corrugate plate is positioned downwardly.

A corrugate plate owns a hill/valley portion in which a first hill portion and a first valley portion are alternately continued along a direction substantially perpendicular to an exhaust gas flow direction. Plural sets of this hill/valley portion have been formed by, being apart from either a second valley portion or a second hill portion along the exhaust gas flow direction. The second valley portion is formed on the downstream side of the first hill portion, and both a first passage and a first filter-conducting portion are continued in a series manner. Also, the second hill portion is formed on the first valley portion located on the downstream side from the second valley portion, both a second passage and a second filter-conducting portion are continued in a series manner.

A first filter-bypassing portion is continued parallel to the first filter-conducting portion and series to the first passage. A second filter-bypassing portion is continued parallel to the second filter-conducting portion and series to the second passage.

In the first filter-conducting portion, the upstream side thereof is communicated to the first passage, and the downstream-side edge portion thereof is narrowed. This narrowing process may be alternatively performed by a clogging process. Preferably, the narrowing process may be realized by deforming the first hill portion, so that the downstream-side edge portion is smoothly continued to a top portion of the first hill portion. In other words, the downstream-side edge portion is preferably narrowed on an inclined plane, the height of which is gradually increased to the downstream side. With employment of this structure, a vector which is directed to the upstream-side plain plate present in the first filter-conducting portion is generated in the exhaust gas flowing through the first filter-conducting portion. As a result, the PM collecting efficiency may be further improved. Moreover, NO contained in the exhaust gas is oxidized by the upstream-side catalyst layer of the first filter-conducting portion, and thus, becomes $NO_2$ having higher oxidation activity, which passes through the plain plate, so that oxidization/combustion as to the PMs collected by the catalyst layer of the plain plate may be further progressed.

In the second filter-conducting portion which is formed by both the second hill portion and the downstream-side plain plate, the upstream side thereof is communicated to the second passage, and the downstream-side edge portion thereof is narrowed. This narrowing process may be alternatively performed by a clogging process. Preferably, the narrowing process may be realized by deforming the first valley portion, so that the downstream-side edge portion is smoothly continued to a bottom portion of the first valley portion. In other words, the downstream-side edge portion is preferably narrowed on an inclined plane, the height of which is gradually decreased toward the downstream side. With employment of this structure, a vector which is directed to the downstream-side plain plate is generated in the exhaust gas flowing through the second filter-conducting portion. As a result, the PM collecting efficiency may be further improved. Moreover, NO contained in the exhaust gas is oxidized by the upstream-side catalyst layer of the second filter-conducting portion, and thus, becomes $NO_2$ having higher oxidation activity, which passes through the plain plate, so that oxidization/combustion as to the PMs collected by the catalyst layer of the plain plate may be further progressed.

As to an opening through which the exhaust gas may be distributed from the first filter-conducting portion to the second passage, although a hole may be formed in a peripheral wall of the second valley portion, side walls whose heights are lower than the height of the first hill portion may be preferably formed on both sides of the second valley portion. As to an opening through which the exhaust gas may be distributed from the second filter-conducting portion to the first passage, side walls whose heights are shallower than the depth of the first valley portion may be preferably formed on both sides of the second hill portion. With employment of this construction, the corrugate plate can be easily formed from one sheet of a metal thin plate by way of a corrugating process.

Also, in the exhaust gas purifying apparatus of the present invention, such a filter catalyst having a wall-flow-structure may be preferably arranged on the exhaust gas downstream side of the above-described semi-filter-structured body. That is, this filter catalyst is comprised of an inlet-side cell clogged on a downstream part thereof; an outlet-side cell neighboring the inlet-side cell and clogged on an upstream part thereof; a cell wall demarcating the inlet-side cell and the outlet side cell and having a number of pores; and a catalyst layer formed on a surface of the cell wall and a inner face of the pores and comprising a catalyst metal and an oxide support.

If such a two-stage construction is formed, then a portion of the PMs can be collected by the upstream-side semi-filter-structured body, so that the depositions of the PMs on the filter catalyst can be suppressed, and also, a deterioration of the activity as to the catalyst metal of the catalyst layer can be suppressed. As a result, it is possible to avoid such a problem that the PM oxidation activity is deteriorated. Also, since the semi-filter-structured body owns the filter-bypassing portion, even when the PMs are deposited, increasing of the exhaust gas pressure loss can be suppressed.

Further, while the exhaust gas flowing through the semi-filter-structured body is branched, the branched exhaust gas is distributed through the filter-conducting portions and the filter-bypassing portions in a complex manner. As a consequence, in the case that this semi-filter-structured body is employed in a system for adding fluid reducing agent such as light oil, since an agitating effect is achieved while the exhaust gas is distributed and the reducing agent is sufficiently mixed with the exhaust gas, the reducing agent may also be further gasified and the reducing activity as to $NO_x$ may be improved, and further, the purifying performance as to $NO_x$ may be improved. Also, in such a case that this semi-filter-structured body is employed in a system for adding urea into exhaust gas, the agitating/resolving effects for the urea fluid may be increased by the semi-filter-structured body. As a result, since the length of the semi-filter-structured body can be made short so as to reduce the capacity thereof, the filter catalyst may be located in the vicinity of an engine, and thus, the oxidizing performance as to the PMs may also be improved.

Also, if an oxidizing catalyst layer manufactured by carrying a catalyst metal in an oxide carrier is formed in the semi-filter-structured body, then the gasification of the reducing agent is progressed by the oxidation activity of the catalyst metal, and the reducing activity as to $NO_x$ can be further improved in the filter catalyst. Then, the PMs deposited in the semi-filter-structured body can be oxidized, increasing of the exhaust gas pressure loss can be suppressed, and also, the PM collecting capability can be reproduced. Further, $NO_2$ having high oxidation activity is produced from NO in the semi-filter-structured body, and then, is entered to the filter catalyst, so that the oxidation of the PMs deposited on the filter catalyst may be progressed.

Then, when the catalyst layer of the filter catalyst is either $NO_x$ sorbing-and-reducing catalyst or urea-$NO_x$-selective-reducing catalyst, the purifying performance as to $NO_x$ may be further improved.

In other words, in the above-explained exhaust gas purifying apparatus, exhaust gas is firstly entered to the semi-filter-structured body, and thereafter, is entered to the filter catalyst. Since the semi-filter-structured body is equipped with the filter-conducting portion through which the exhaust gas is distributed via the filter body and the filter-bypassing portion of bypassing the filter-conducting portion, a portion of the PMs contained in the exhaust gas is collected by the filter body. Also, increasing of the exhaust gas pressure loss can be suppressed by the filter-bypassing portion. Then, since the exhaust gas flows in a complex manner while the exhaust gas is branched, in such a case that the semi-filter-structured body is used in the system for adding the fluid reducing agent, even if the length of this semi-filter-structured body is short, the reducing agent is sufficiently mixed with the exhaust gas due to the agitating effect, and the gasification of the reducing agent may be progressed. Also, in the case that the semi-filter-structured body is used in the system for adding the urea, the urea fluid may be effectively agitated/solved.

When such an exhaust gas is entered to the downstream-side filter catalyst, the PMs contained in the exhaust gas are collected in the pores of the cell wall, and are continuously oxidized/purified by the catalyst metal of the catalyst layer. As a consequence, since a heat generation amount is small and thermal stress is also small, breaking of the filter catalyst can be avoided and superior durability can be obtained. Further, increasing of the exhaust gas pressure loss can be suppressed. In the case that the semi-filter-structured body is employed in a system for adding fluid reducing agent, since the reducing agent has been sufficiently gasified, such a problem that the fluid reducing agent is adhered to the upstream-side edge plane of the filter catalyst, and the PMs are adhered and deposited on this upstream-side edge plane can be suppressed, and also, the reducing activity as to $NO_x$ by the reducing agent can be improved. Also, in the case that the semi-filter-structured body is employed in a system for adding urea, since agitating/solving of the urea fluid have been progressed, the reducing activity as to $NO_x$ may be improved in the urea-$NO_x$-selective-reducing catalyst layer of the filter catalyst.

The filter catalyst owns a honeycomb structural body, and a catalyst layer which is formed on a surface of the cell wall and on surfaces within pores, and is constituted by carrying a catalyst metal on an oxide carrier. The honeycomb structural body is constituted by an inlet-side cell which is clogged on the downstream side of the exhaust gas; an outlet-side cell which is located adjacent to the inlet-side cell and is clogged on the upstream side of the exhaust gas; a porous cell wall having a large number of pores, which partitions the inlet-side cell from the outlet-side cell.

The honeycomb structural body may be alternatively manufactured by thermal resistant ceramics such as cordierite and silicon carbide. For instance, a slurry under clay condition which contains cordierite powder as a major component is processed, and the processed slurry is molded by way of extrusion molding, and then, the molded honeycomb body is sintered. Alternatively, instead of this cordierite powder, respective powder of alumina, magnetia, and silica may be mixed so as to constitute a cordierite composition. Thereafter, a cell opening of one edge plane is sealed by a slurry under clay condition to form a check pattern, whereas, a cell opening of such a cell which is located adjacent to the cell sealed on one edge plane is sealed on the other edge plane. Thereafter, the sealing material is fixed by way of a sintering process, so that the honeycomb structural body may be manufactured.

In order to form the pores in the cell wall of the honeycomb structural body, while such combustible powder as carbon powder, wood chips, starch, and resin powder has been mixed in the above-described slurry, the combustible powder may disappear during the sintering process, so that these pores may be formed. Also, since both grain diameters and adding amounts of the combustible powder are adjusted, distributions of the surface evacuated holes and the diameters of the internal pores, and also, opening areas may be controlled.

Similar to the conventional DPF, as to the pore distribution in the cell wall of the honeycomb structural body, the porosity thereof may be set within a range from 40% to 80%, and the averaged diameter of these pores may be set within a range from 10 μm to 50 μm. When either the porosity or the averaged diameter of the pores are deviated from the relevant range, there are some cases that the PM collecting efficiency is lowered, and the exhaust gas pressure loss is increased.

The catalyst layers which are made by carrying the catalyst metal in the oxide carrier have been formed in both the surface of the cell wall and the surfaces within the pores. This catalyst layer may be manufactured from an oxidizing catalyst, 3-way catalyst, or $NO_x$ sorbing-and-reducing catalyst. In this case, as to the oxide carrier, such an oxide as alumina, ceria, zirconia, and titania, or such a composite oxide made of these plural sorts of oxides may be employed. As the catalyst metal, one sort, or plural sorts of noble metals belonging to the platinum group such as Pt, Rh, Pd, Ir, and Ru may be preferably employed. If a carry amount of the catalyst metal is smaller than 0.1 g of a 1 liter volume of the honeycomb structural body, then activity becomes excessively low and this carry amount cannot be practically used. To the contrary, even if a carry amount of catalyst metal is larger than 5 g, then activity is saturated and manufacturing cost thereof is increased.

Preferably, the catalyst layer may be formed from $NO_x$ sorbing-and-reducing catalyst containing a $NO_x$ sorbing material which is selected from an alkali metal, an alkaline-earth metal, and a rare earth metal may be contained in the catalyst layer. If the $NO_x$ sorbing material is contained in the catalyst layer, then $NO_2$ produced by the oxidation by the catalyst metal can be occluded in the $NO_x$ sorbing material, so that $NO_x$ can be further purified. It is desirable to set a carry amount of the $NO_x$ sorbing material within a range between 0.05 mol and 0.45 mol per 1 liter volume of the honeycomb structural body. If a carry amount of the $NO_x$ sorbing material is smaller than this range, then activity becomes excessively low and this carry amount cannot be practically used. To the contrary, if a carry amount of the $NO_x$ sorbing material is larger than this range, then the $NO_x$ sorbing material covers the catalyst metal and activity is lowered.

Also, the catalyst layer may be preferably formed from urea-$NO_x$-selective-reducing catalyst. In this case, as the oxide carrier, such an oxide as zeolite, alumina, ceria, zirconia, titania, and vanadium oxide, or a composite oxide made of plural sorts of these oxides may be employed. As the catalyst metal, Cu is typically exemplified.

In order to form the catalyst layer in the honeycomb structural body, either oxide powder or composite oxide powder is processed in combination with a binder component such as an alumina sol and water so as to obtain a slurry. After this slurry is adhered to the cell wall, the resultant carrier layer may be sintered, and thereafter, a catalyst metal may be carried in this sintered carrier layer. Alternatively, a slurry may be produced from such a catalyst powder that a catalyst metal has previously been carried in either the oxide powder or the composite oxide powder. In order to adhere the slurry to the cell wall, the normal dipping process may be employed. However, it is desirable that the slurry is forcibly filled into the pores by way of either air blow or air suction, and an extra slurry portion entered in the pores is removed.

Preferably, a forming amount of the catalyst layer may be selected to be 30 g to 200 g per 1 liter volume of the honeycomb structural body. When the catalyst layer is smaller than 30 g/L, it is not possible to avoid such a fact that durability of either the catalyst metal or the $NO_x$ sorbing material is lowered. If the catalyst layer exceeds 200 g/L, then the pressure loss becomes excessively high, and this catalyst layer cannot be practically used.

Both the semi-filter-structured body and the filter catalyst are arranged in this order in a series manner from the upstream side of the exhaust gas to the downstream side. Although the semi-filter-structured body and the filter catalyst may be arranged in a certain interval, these semi-filter-structured body and filter catalyst may be preferably arranged adjacent to each other in order to suppress lowering of the temperature of the exhaust gas. Also, a structural ratio of the semi-filter-structured body to the filter catalyst may be preferably set to such a range that semi-filter-structured body: filter catalyst=1 to 5:5 to 1 in a volume ratio.

An oxidizing catalyst layer formed by carrying the catalyst metal in the oxide carrier may be further preferably formed in the semi-filter-structured body. As a result, the PMs which are collected by the semi-filter-structured body can be oxidized. Also, since $NO_2$ having high oxidizing activity is produced by the oxidation of NO, the oxidation as to the PM collected by the filter catalyst may be progressed. Then, when this semi-filter-structured body is employed in a system for adding fluid reducing agent, since the fluid reducing agent is oxidized, the gasification is progressed, so that the purifying performance as to $NO_x$ in the filter catalyst may be improved. Also, when this semi-filter-structured body is employed in a system for adding urea, since the temperature of the semi-filter-structured body is increased due to reaction heat produced by the oxidation as to HC and CO, decomposition of the urea fluid may be progressed, so that the purifying performance as to $NO_x$ in the filter catalyst may be improved. The catalyst layer of the semi-filter-structured body contains at least a noble metal belonging to a platinum group, and may be formed in a similar manner to the catalyst layer of the filter catalyst.

It should be understood that in the above-described exhaust gas purifying apparatus, an oxidizing catalyst, 3-way catalyst, $NO_x$ sorbing-and-reducing catalyst, or the DPF may be alternatively arranged on the further upstream side, from the semi-filter-structured body. It should also be understood that in the above-described exhaust gas purifying apparatus, an oxidizing catalyst, 3-way catalyst, $NO_x$ sorbing-and-reducing catalyst, or the DPF may be alternatively arranged on the further downstream side from the filter catalyst.

EMBODIMENTS

Next, the present invention will be concretely explained based upon embodiments and comparison examples.

Embodiment 1

Figure 2:
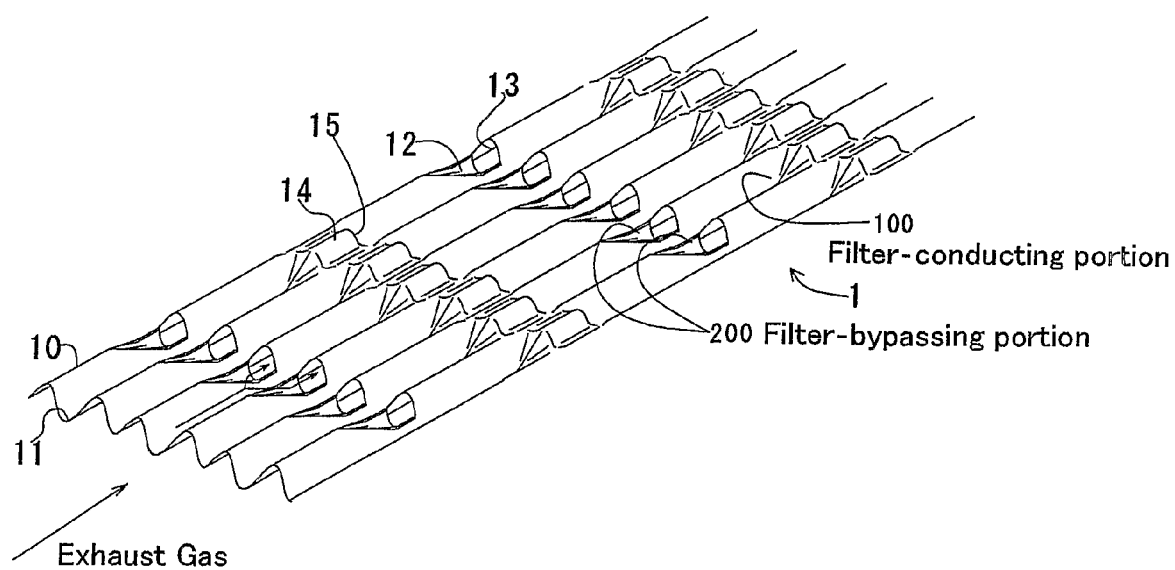
FIG. 2 is a perspective view for representing a major portion of a corrugate plate employed in the exhaust gas purifying apparatus of the embodiment 1.
Figure 3:
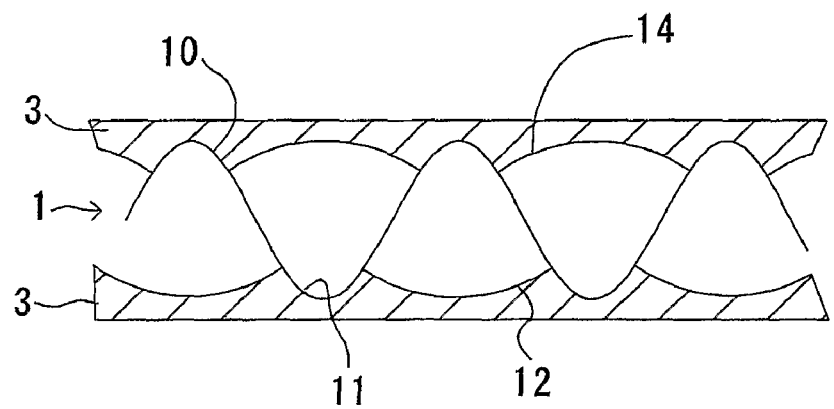
FIG. 3 is an enlarged perspective view for showing a major portion of the exhaust gas purifying apparatus of the embodiment 1.
Figure 4:
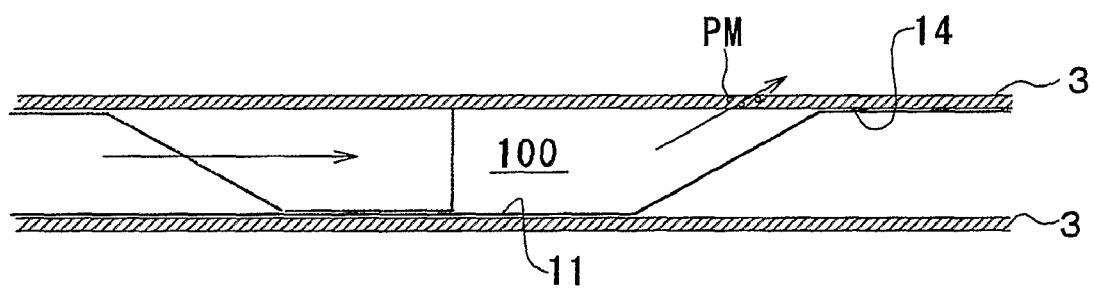
FIG. 4 is an enlarged perspective view for showing a major portion of the exhaust gas purifying apparatus of the embodiment 1.
Figure 5:
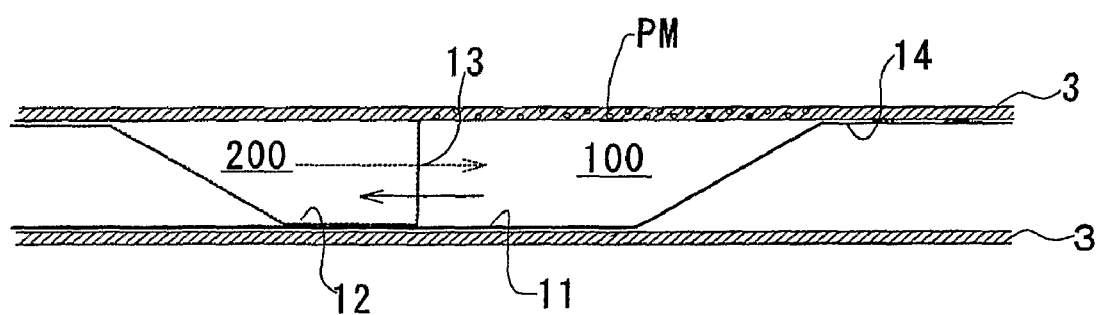
FIG. 5 is an enlarged perspective view for showing a major portion of the exhaust gas purifying apparatus of the embodiment 1.

FIG. 1 shows both a perspective view and an enlarged view for showing a major portion of an exhaust gas purifying apparatus according to an embodiment 1 of the present invention. FIG. 2 is a perspective view for representing a major portion of a corrugate plate of the exhaust gas purifying apparatus. FIG. 3 to FIG. 5 are enlarged sectional views for showing major portions of the semi-filter-structured body. This exhaust gas purifying apparatus is constituted by a semi-filter-structured body, and an outer cylinder 4 into which the semi-filter-structured body has been forced and has been held. The semi-filter-structured body is manufactured in such a manner that a corrugate plate 1 having a thickness of 60 µm and a plain plate (filter member) 3 having a thickness of 60 µm and an integrated amount of 450 g/m² are alternately stacked with each other. The corrugate plate 1 is made of stainless steel and has been processed by a corrugation manner. The plain plate 3 is manufactured by non-woven fabric cloth made of a stainless fiber.

In the corrugate plate 1 shown in FIG. 2, hill portions 10 and valley portions 11 are alternately continued to each other along a direction perpendicular to a flow direction of exhaust gas. In the hill portions 10, a plurality of intermediate valley portions 12 having concave shapes have been formed in such a manner that these intermediate valley portions 12 are mutually separated from each other in a certain internal, which are positioned parallel to the flow direction of the exhaust gas. Heights of the intermediate valley portions 12 are gradually lowered and directed from an upstream side of the exhaust gas to a downstream side of the exhaust gas, and tip portions of the intermediate valley portions 12 are notched, and then, openings 13 have been formed which are again communicated to the hill portions 10. Depths of bottom portions of the intermediate valley portions 12 are made coincident with positions of bottom portions of the valley portions 11.

Also, in the valley portion 11, a plurality of intermediate hill portions 14 having convex shapes have been formed in such a manner that these intermediate hill portions 14 are mutually separated from each other in a certain interval, which are positioned parallel to the flow direction of the exhaust gas. One intermediate hill portion 14 is arranged between two intermediate valley portions 12 along the exhaust gas flow direction, the height of which is made coincident with the height of the hill portion 10.

As also shown in FIG. 3, the plurality of corrugate plates 1 and the plurality of plain plates 3 have been alternately stacked with each other in such a manner that phases of the intermediate valley portions 12 are identical to phase of the intermediate hill portions 14 along the exhaust gas flow direction, and along a direction perpendicular to the exhaust gas flow direction. Both the intermediate valley portions 12 and the intermediate hill portions 14 have been arranged in such a manner that in such a sectional plane that these intermediate valley and hill portions 12/14 are cut at a right angle with respect to the exhaust gas flow direction of the semi-filter-structured body, both the intermediate valley and hill portions 12/14 are located at the same positions, respectively. Also, the hill portion 10 abuts against the upper-side plain plate 3, whereas the valley portion 11 abuts against the lower-side plain plate 3.

As indicated in FIG. 4 to FIG. 7, in this exhaust gas purifying apparatus, a filter-conducting portion 100 has been formed on the inlet surface side of the corrugate plate 1, in which a passage has been blocked between the upper-side plain plate 3 and the both-side hill portions 10 located adjacent to the intermediate hill portion 14. Also, another filter-conducting portion 101 has been formed on the rear surface side of the corrugate plate 1, in which a passage has been blocked between the lower-side plain plate 3 and the both-side valley portions 11 located adjacent to the intermediate valley portion 12. Then, on the upstream side of the filter-conducting portion 100, the height of the hill portion 10 at the position of the intermediate valley portion 12 becomes low, and the opening 13 has been formed, so that the exhaust gas flowing through the valley portion 11 can be branched to be entered from the both-side openings 13 to the both-side hill portions 10, and a filter-bypassing portion 200 has been formed at this portion. Also, on the rear surface side, the depth of the valley portion 11 becomes shallow at the position of the intermediate hill portion 14 on the upstream side of the filter-conducting portion 101, and openings 15 have been formed, so that the exhaust gas flowing through the hill portion 10 can be branched to be entered from the both-side openings 15 to the both-side valley portions 11, and another detour portion 201 has been formed also at this portion.

As a consequence, as shown in FIG. 4, in accordance with the exhaust gas purifying apparatus of this embodiment 1, the exhaust gas flowing through the passage which has been formed between the valley portion 11 and the upper-side plate 3 collides with the intermediate hill portion 14. Under such a condition that a PM collecting amount of the upper-side plain plate 3 is small, most of the exhaust gas flows through the upper-side plain plate 3, and then, is entered to the corrugate plate 1 which is present on the opposite side of the plain plate 3, and thus, most of the PMs are collected by the plain plate 3.

When the PM collecting amount is increased so that pressure of the exhaust gas in the filter-conducting portion 100 is increased, since reaction force is exerted as indicated by an arrow of a solid line in FIG. 5, the exhaust gas flows from the intermediate valley portion 12, passes through the opening 13, and then, is branched to be entered into the adjoining hill portion 10 in the filter-bypassing portion 200 which is present on the upstream side, as indicated by an arrow of a dot line. As a consequence, an increase of an exhaust gas pressure loss may be suppressed.

Figure 6:
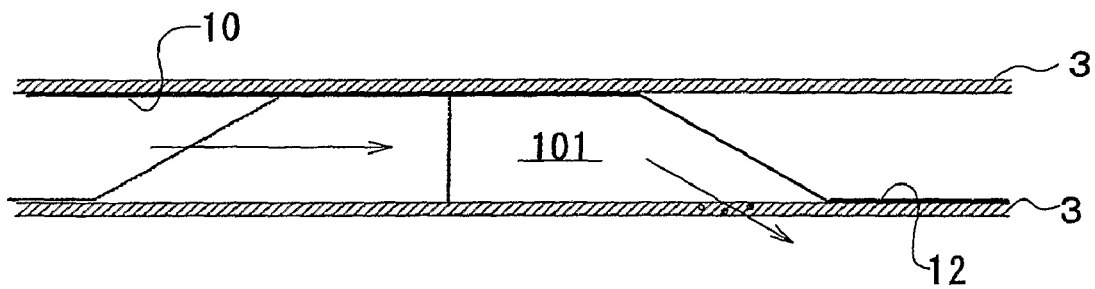
FIG. 6 is an enlarged perspective view for showing a major portion of the exhaust gas purifying apparatus of the embodiment 1.

Similarly, as shown in FIG. 6, the exhaust gas flowing through the passage which has been formed between the hill portion 10 and the lower-side plate 3 collides with the intermediate valley portion 12 in the filter-conducting portion 101. Under such a condition that a PM collecting amount of the lower-side plain plate 3 is small, most of the exhaust gas flows through the lower-side plain plate 3, and then, is entered to the corrugate plate 1 which is present on the opposite side of the plain plate 3, and thus, most of the PMs are collected by the plain plate 3.

Figure 7:
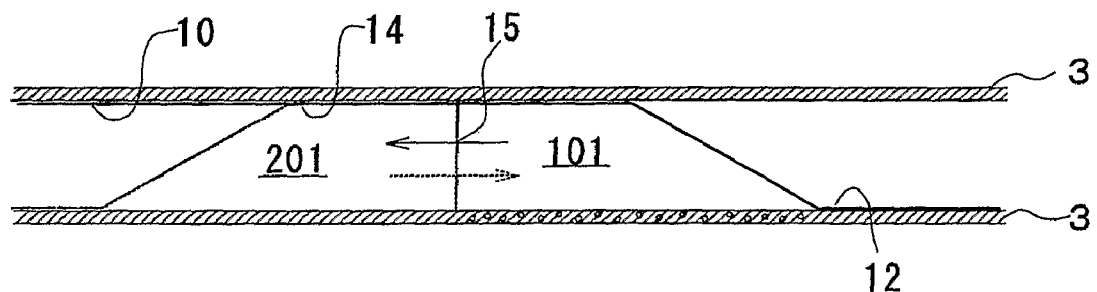
FIG. 7 is an enlarged perspective view for showing a major portion of the exhaust gas purifying apparatus of the embodiment 1.

When the PM collecting amount is increased so that pressure of the exhaust gas in the filter-conducting portion 101 is increased, since reaction force is exerted as indicated by an arrow of a solid line in FIG. 7, the exhaust gas flows from the intermediate hill portion 14, passes through the opening 15, and then, is branched to be entered into the valley portion 11 in the filter-bypassing portion 201 which is present on the upstream side, as indicated by an arrow of a dot line. As a consequence, an increase of an exhaust gas pressure loss may be suppressed.

In accordance with the exhaust gas purifying apparatus of this embodiment 1, since the above-described cycle is continuously repeated from the edge plane of the exhaust gas inlet side toward the edge plane of the exhaust gas outlet side, the PMs are collected by the plain plate 3 in the filter-conducting portions 100 and 101. Then, since a large number of these filter-conducting portions 100 and 101 have been formed, the PMs are collected in such a manner that the PMs are uniformly distributed over the entire plain plate 3, so that the collecting efficiency may be improved, and even when the PMs are collected, the exhaust gas pressure loss can be hardly increased. In other words, the improvement in the PM collecting efficiency is compatible with the increase in the exhaust gas pressure loss.

Furthermore, in the exhaust gas purifying apparatus of this embodiment 1, an opening area of the corrugate plate 1, as viewed in a plane, in the filter-conducting portions 100 and 101 occupies approximately 40% of a total opening area of the corrugate plate 1, as viewed in the plane, whereas a total capacity of the filter-conducting portions 100 and 101 occupies approximately 50% of a total capacity of both the hill portions 10 and the valley portions 11. As a result, the utilizing area of the plain plates 3 is large, the PM collecting efficiency is high, and the increase in the exhaust gas pressure loss is suppressed.

Embodiment 2

Figure 8:
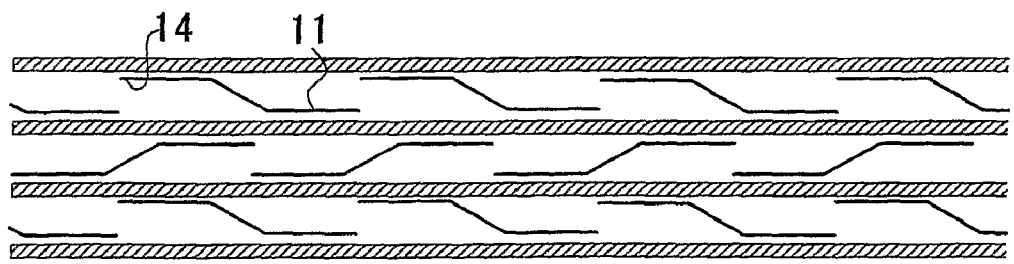
FIG. 8 is an enlarged perspective view for representing a major portion of the exhaust gas purifying apparatus of the embodiment 2.

An exhaust gas purifying apparatus of this embodiment 2 is similar to that of the embodiment 1 except for a stacking condition of corrugate plates 1. As shown in FIG. 8, in this filter apparatus, corrugate plates 1 similar to those of the embodiment 1 are alternately stacked in normal and turned directions. In other words, the corrugate plates 1 are stacked in such a manner that these corrugate plates 1 are positioned parallel to surfaces of plain plates 3 and are alternately inverted at an angle of 180 degrees.

Although effects of the exhaust gas purifying apparatus of this embodiment 2 are inferior to those of the embodiment 1, the effects as to an improvement in a PM collecting efficiency and suppressing of an increase of an exhaust gas pressure loss may appear.

Comparison Example 1

It is so assumed that the filter apparatus described in the embodiment 1 of German Utility Model No. 20,117,873 U1 is assumed as a comparison example 1.

That is to say, in the exhaust gas purifying apparatus of the comparison example 1, while corrugate plates 1 similar to those of the embodiment 1 are employed, these corrugate plates 1 are alternately stacked with plain plates 3 similar to those of the embodiment 1. However, the corrugate plates 1 are inverted at an angle of 180 degrees in such a manner that the exhaust gas inlet side is located at the exhaust gas outlet side of the embodiment 1, and the exhaust gas outlet side is located at the exhaust gas inlet side of the embodiment 1.

Examination/Evaluation

While both the exhaust gas purifying apparatus of the embodiment 1 and the exhaust gas purifying apparatus of the comparison example 1 were employed, both PM collecting ratios and exhaust gas pressure losses were measured. Each of the semi-filter structural bodies owns an approximately 1 L defined by a diameter of 130 mm and a length of 75 mm. Also, a total number of cells per 1 inch$^2$ of a sectional area is equal to 200 in each of the exhaust gas purifying apparatus.

While the exhaust gas purifying apparatus of the embodiment 1 and the comparison example 1 are mounted on an exhaust pipe of a diesel engine respectively, both PM collecting ratios and exhaust gas pressure losses were measured every predetermined time period during stationary driving operation. Since a PM exhaust amount exhausted from an engine is already known, PM amounts collected in response to measuring time are calculated, and then, measurement values as to PM collecting ratios and exhaust gas pressure losses with respect to the collected PM amounts are represented in FIG. 9.

Figure 9:
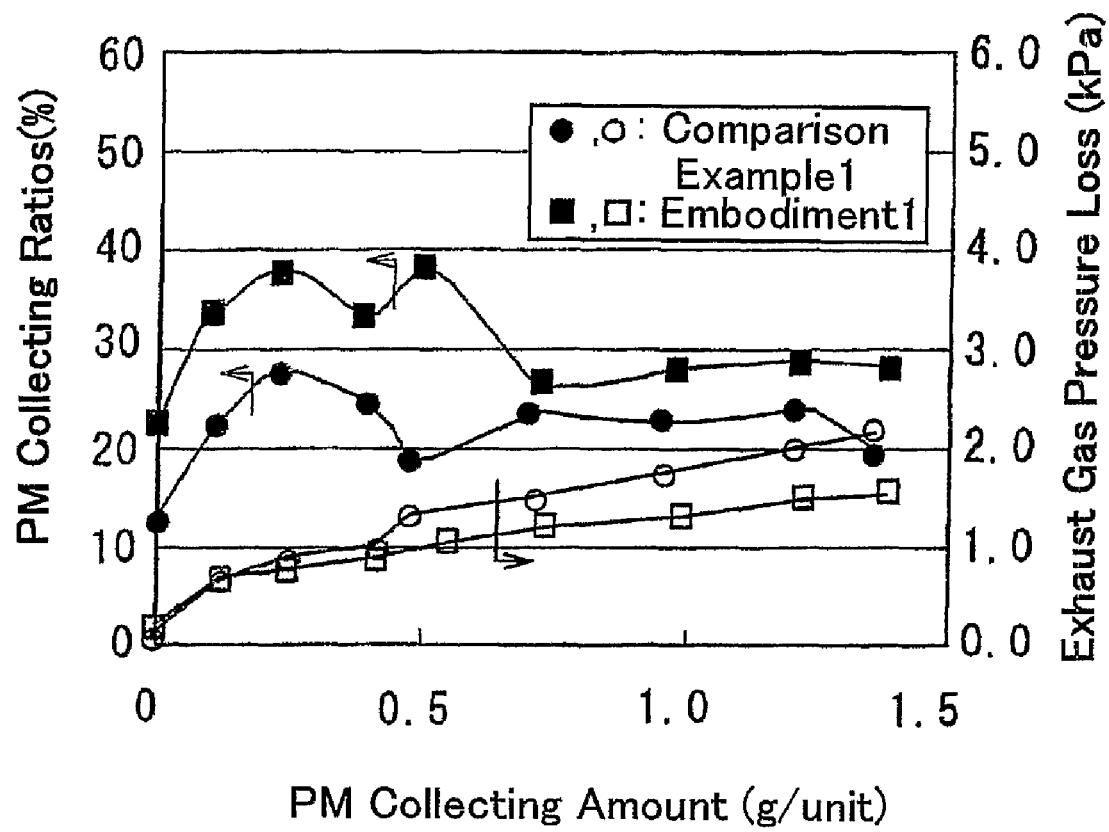
FIG. 9 is a graph for indicating a relationship between a PM collecting efficiency and an exhaust gas pressure loss with respect to PM collecting amounts as to the exhaust gas purifying apparatus of the embodiment 1 and an exhaust gas purifying apparatus of a comparison example 1.

As can be understood from FIG. 9, in the exhaust gas purifying apparatus of the embodiment 1, the PM collecting ratios thereof is high, and increasing of the exhaust gas pressure loss is suppressed, as compared with those of the comparison example 1. It is obvious that these differences are caused by the differences in the directions of the corrugate plates 1.

Embodiment 3

Figure 10:
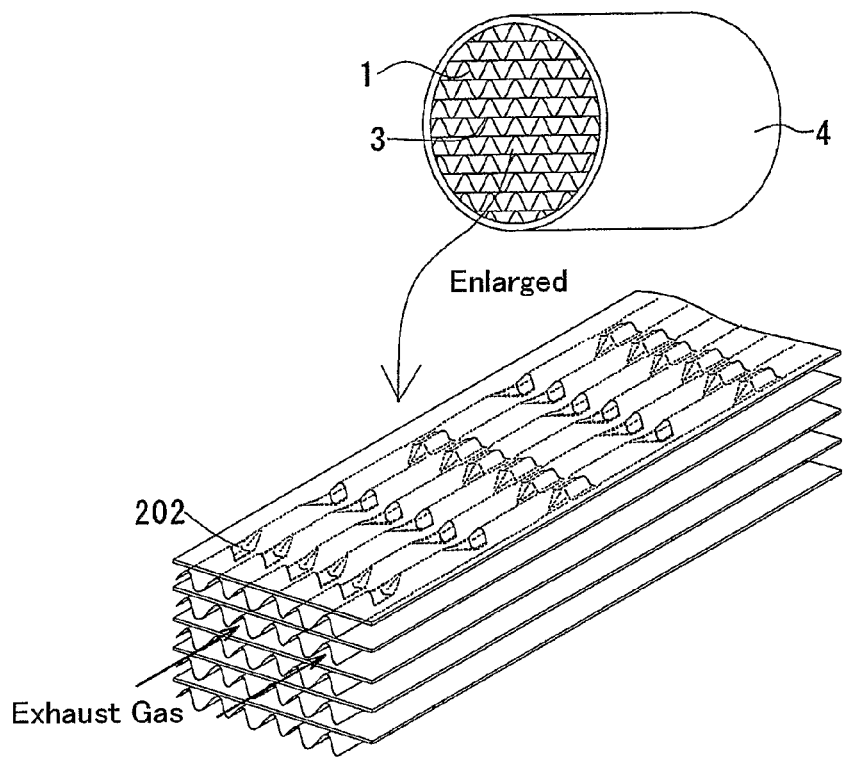
FIG. 10 is a perspective view and an enlarged perspective views, which show an exhaust gas purifying apparatus of an embodiment 3 and a major portion thereof.
Figure 11:
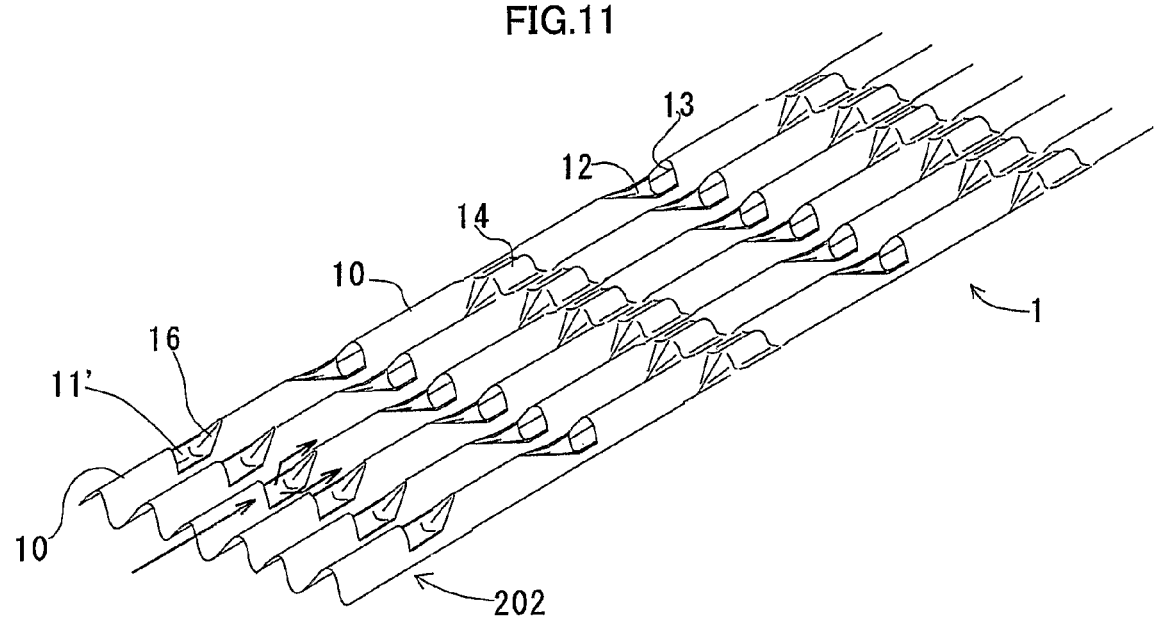
FIG. 11 is a perspective view for representing a major portion of a corrugate plate employed in the exhaust gas purifying apparatus of the embodiment 3.

A structure of an exhaust gas purifying apparatus of this embodiment 3 is similar to that of the embodiment 1 except that a structure of a corrugate plate at an edge portion of an exhaust gas inlet side of this embodiment 3 is different from that of the embodiment 1. As shown in FIG. 10 and FIG. 11, in the exhaust gas purifying apparatus of this embodiment 3, a hill portion 10 having an opening which is notched on the downstream side has been formed at an edge plane of an exhaust gas inlet side, and a valley portion 11' has been formed which is continued to this downstream-side opening. A turned intermediate valley portion 16 whose depth is gradually shallow has been formed in this valley portion 11', and the turned intermediate valley portion 16 is continued to a hill portion 10 on the downstream side, and then, a filter-bypassing portion 202 of the uppermost stream has been formed in this portion.

That is to say, in the exhaust gas purifying apparatus of this embodiment 3, as indicated by an arrow in FIG. 11, the exhaust gas is firstly entered from the upstream-side edge plane to the hill portion 10, and the exhaust gas flowed from the hill portion 10 is entered from the valley portion 11' of the downstream side of this hill portion 10 into the turned intermediate valley portion 16. Since the turned intermediate valley portion 16 is continued to the hill portion 10 on the downstream side, an upper plane of a tip portion has been blocked by the plain plate 3. However, even when PMs are deposited on this portion, there is a space between the turned intermediate valley portion 16 and the plain plate 3 up to a halfway of this turned intermediate valley portion 16, and thus, the exhaust gas is branched to be entered from this space to the both-side valley portions 11.

As a consequence, since the filter-bypassing portion 202 has been formed in the uppermost stream, the depositions of the PMs with respect to the exhaust gas inlet-side edge plane are suppressed, and blocking of the edge plane is prevented, and further, melting losses caused by excessively increased temperatures can be also avoided.

Embodiment 4

Figure 12:
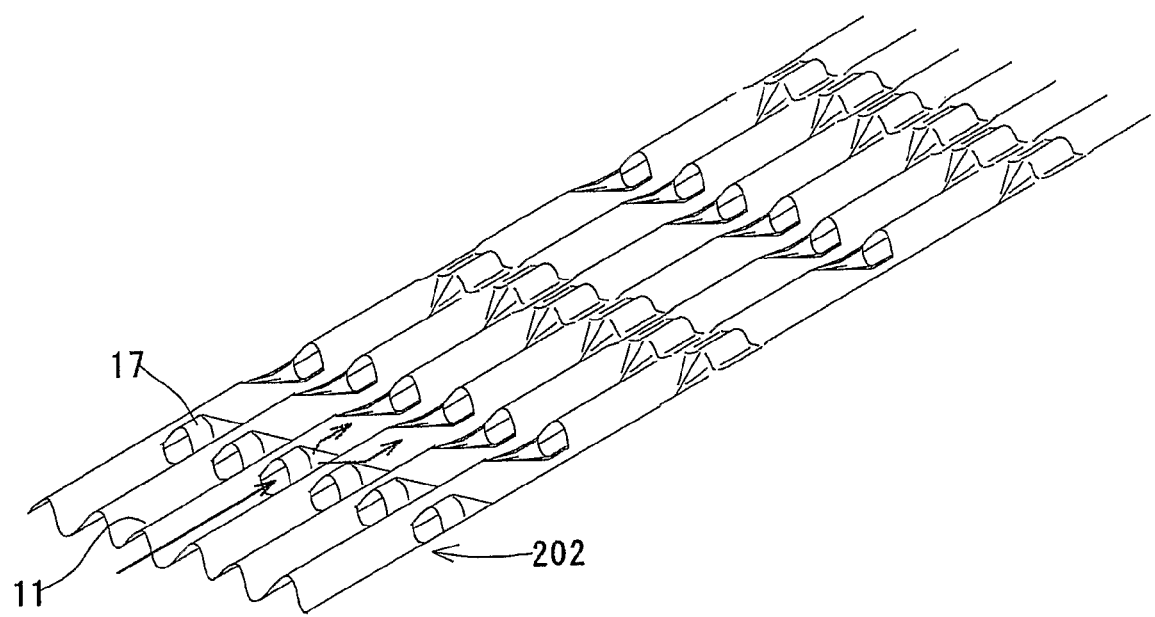
FIG. 12 is a perspective view for representing a major portion of a corrugate plate employed in an exhaust gas purifying apparatus of an embodiment 4.

A structure of an exhaust gas purifying apparatus of this embodiment 4 is similar to that of the embodiment 1 except that a structure of a corrugate plate 1 at an edge portion of an exhaust gas inlet side of this embodiment 4 is different from that of the embodiment 1. As shown in FIG. 12, in the exhaust gas purifying apparatus of this embodiment 4, a valley portion 11 and a turned intermediate hill portion 17 have been formed at an edge plane of an exhaust gas inlet side. The turned intermediate hill portion 17 has been formed in this valley portion 11, and has been opened on the upstream side. A height of this turned intermediate hill portion 17 has been gradually lowered toward the downstream side, and the turned intermediate hill portion 17 has been continued to a valley portion 11 on the downstream side, and then, a filter-bypassing portion 202 of the uppermost stream has been formed in this portion.

That is to say, in the exhaust gas purifying apparatus of this embodiment 4, as indicated by an arrow in FIG. 12, the exhaust gas is firstly entered to the valley portion 11, and subsequently, is entered to the turned intermediate hill portion 17. Since the height of the turned intermediate hill portion 17 is gradually lowered as this turned intermediate hill portion 17 is continued to the valley portion 11 on the downstream side, a lower plane of a tip portion has been blocked by the plain plate 3 on the side of a rear plane. However, even when PMs are deposited on this portion, there is a space between the turned intermediate hill portion 17 and the plain plate 3 up to a halfway of this turned intermediate hill portion 17, and thus, the exhaust gas is branched to be entered from this space to the both-side hill portions 10.

As a consequence, since the filter-bypassing portion 202 has been formed in the uppermost stream, the depositions of the PMs with respect to the exhaust gas inlet-side edge plane are suppressed, and blocking of the edge plane is prevented, and further, melting losses caused by excessively increased temperatures can be also avoided.

Embodiment 5

Figure 13:
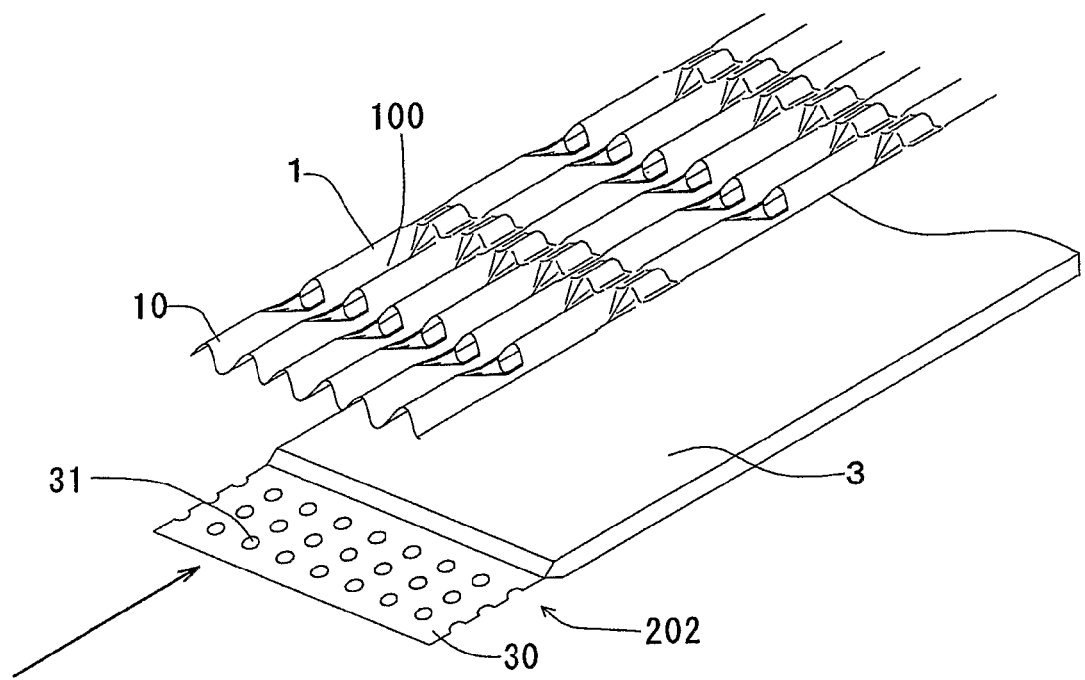
FIG. 13 is a perspective view for showing a major portion of an exhaust gas purifying apparatus of an embodiment 5.

A structure of an exhaust gas purifying apparatus shown in FIG. 13 of this embodiment 5 is similar to that of the embodiment 1 except that a structure of a plain plate 3 at an edge portion of an exhaust gas inlet side of this embodiment is different from that of the embodiment 1. While only the exhaust gas inlet-side edge portion of the plain plate 3 has been made of a metal plate 30, a plurality of holes 31 have been formed in this metal plate 30. A diameter of this hole is several mm.

In other words, in the exhaust gas purifying apparatus of this embodiment 5, since the holes 31 have been formed on the upstream side of the filter-conducting portion 100, the exhaust gas entered to the hill portion 10 passes through the holes 31 in combination with PMs, and then, is entered to the next corrugate plate 1 which has been stacked on the side of the rear plane. As a consequence, since the filter-bypassing portion 202 has been formed in the uppermost stream, the depositions of the PMs with respect to the exhaust gas inlet-side edge plane are suppressed, and blocking of the edge plane is prevented, and further, melting losses caused by excessively increased temperatures can be also avoided.

Embodiment 6

Figure 14:
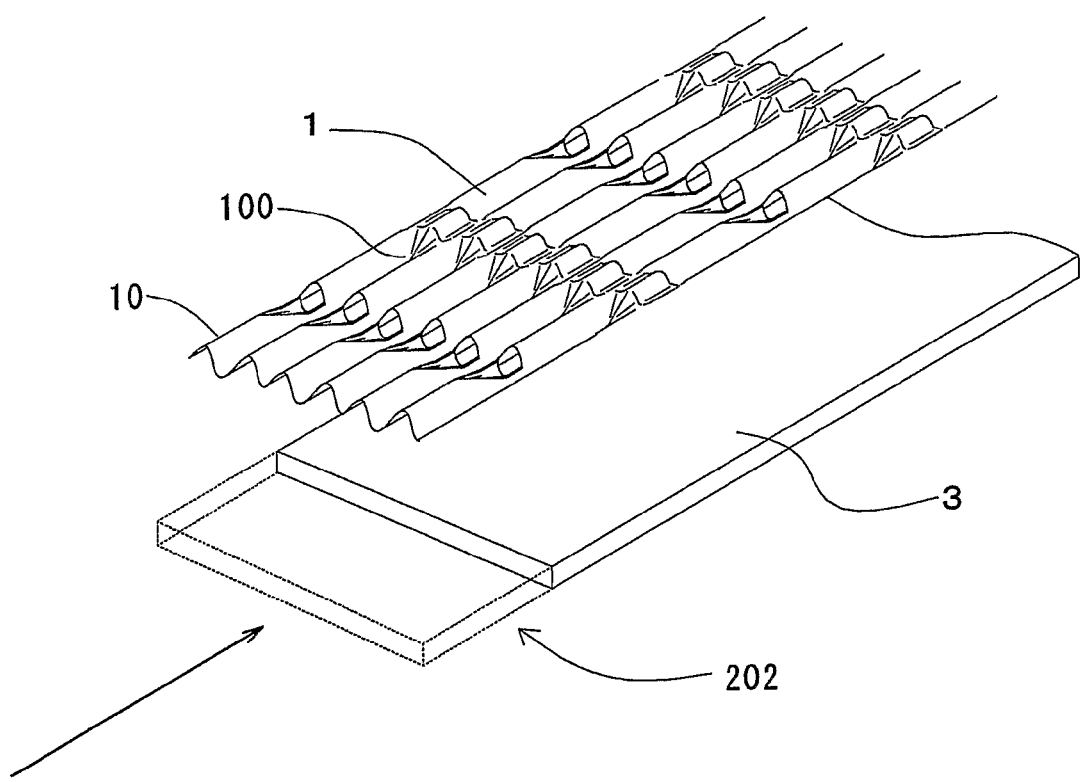
FIG. 14 is a perspective view for showing a major portion of an exhaust gas purifying apparatus of an embodiment 6.

A structure of an exhaust gas purifying apparatus shown in FIG. 14 of this embodiment 6 is similar to that of the embodiment 1 except that a structure of a plain plate 3 at an edge portion of an exhaust gas inlet side of this embodiment is different from that of the embodiment 1. A length of the plain plate 3 along the exhaust gas flowing direction is made shorter than a length of a corrugate plate 1, and the plain plate 3 is not present on the lower side of the hill portion 10 at an exhaust gas inlet-side edge portion of the corrugate plate 1.

That is to say, in the exhaust gas purifying apparatus of this embodiment 6, since the plain plate 3 is not present on the upstream side of the filter-conducting portion 100, the exhausted gas entered to the hill portion 10 is entered to the next corrugate plate 1 in combination with PMs, which has been stacked on the side of the rear plane. As a consequence, since the filter-bypassing portion 202 has been formed in the uppermost stream, the depositions of the PMs with respect to the exhaust gas inlet-side edge plane are suppressed, and blocking of the edge plane is prevented, and further, melting losses caused by excessively increased temperatures can be also avoided.

Examination/Evaluation

While the exhaust gas purifying apparatus of the embodiments 1, 3 to 6, and of the comparison example 1 were employed, PM collecting ratios, exhaust gas pressure losses, and inlet edge plane blocking ratios were measured. Each of filter elements owns a capacity of approximately 1 L, and has a diameter of 130 mm and a length of 75 mm. A total number of cells per 1 inch² of a sectional area is equal to 200.

The respective exhaust gas purifying apparatus of the embodiments and the comparison example were mounted on an exhaust pipe of a diesel engine (2 L), and an oxidizing catalyst of 1.3 L was arranged on the upstream side of this exhaust pipe. Then, the diesel engine was driven for 10 hours under EGR full open condition, UDC quasi-mode which corresponds to such a condition that PMs are exhausted in high concentration, and then, a ratio of the cell openings in the inlet edge plane of the semi-filter-structured body, which had been blocked by the PMs, was measured in a visual manner. Also, both PM collecting ratios and exhaust gas pressure losses were measured at such a time instant when a PM deposited amount became 1 g/L during the stationary driving operation (2400 rpm, 50 Nm, soot amount of 2 g/L). Measurement results are indicated in a table 1.

TABLE 1

| | inlet edge plane blocking ratios (%) | pressure loss (KPa) | PM collecting ratios (%) |
|---|---|---|---|
| embodiment 3 | 20 | 2.4 | 53 |
| embodiment 4 | 20 | 2.4 | 53 |
| embodiment 5 | 20 | 2.4 | 50 |
| embodiment 6 | 10 | 2.2 | 50 |
| embodiment 1 | 80 | 2.5 | 48 |
| comparison example 1 | 20 | 3.0 | 36 |

From the table 1, the following facts could be apparently revealed. That is, the inlet edge plane blocking ratios as to the exhaust gas purifying apparatus of the embodiment 3 to the embodiment 6 are lower than the inlet edge plane blocking ratios of the exhaust gas purifying apparatus of the embodiment 1. This reason is apparent from such an effect that the filter-bypassing portion 202 has been formed in the uppermost stream. Also, the PM collecting ratios as to the exhaust gas purifying apparatus of the embodiments 3 to 6 are high, as compared with that of the comparison example 1. Also, the increases in the exhaust gas pressure losses are largely suppressed, as compared with that of the comparison example 1. It is apparent that these differences are caused by the differences in the directions of the corrugate plates 1.

Embodiment 7

Figure 15:
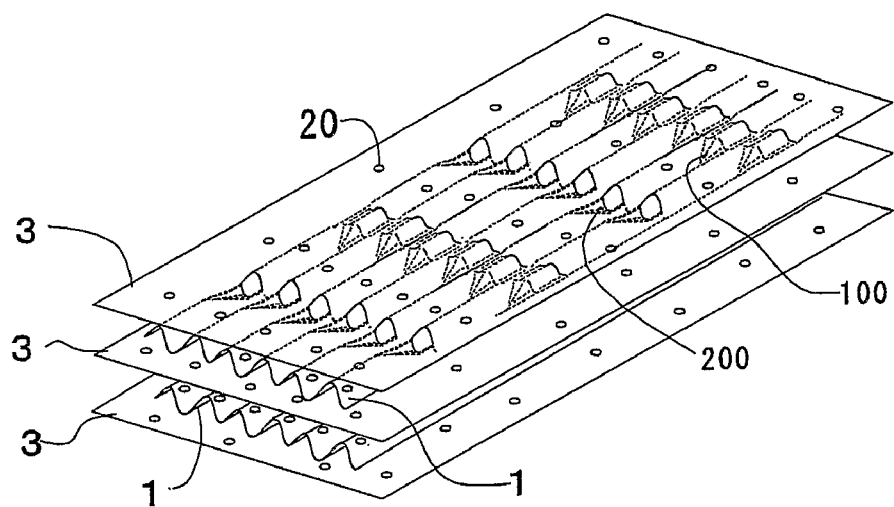
FIG. 15 is an enlarged perspective view for showing a major portion of an exhaust gas purifying apparatus of an embodiment 7.
Figure 16:
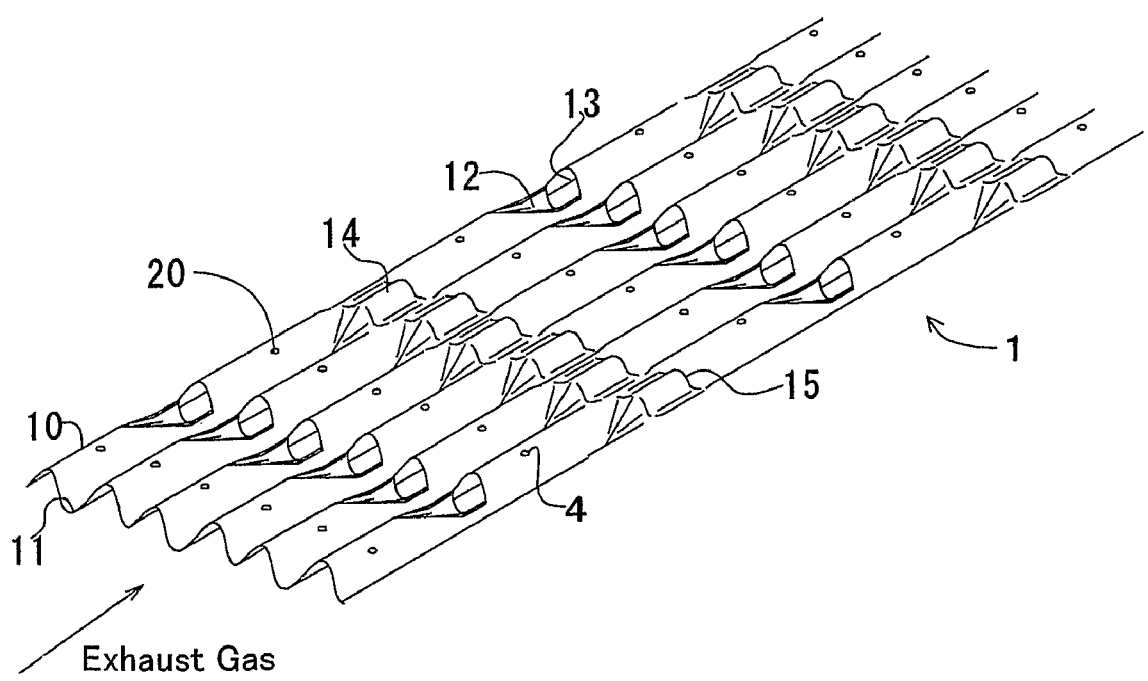
FIG. 16 is an enlarged perspective view for indicating a major portion of a corrugate plate employed in an exhaust gas purifying apparatus of the embodiment 7.

A semi-filter-structured body of an exhaust gas purifying apparatus according to this embodiment 7, shown in FIG. 15, is similar to the semi-filter-structured body of the embodiment 1 except that plain plates 3 have been manufactured by stainless thin plates, and holes 20 have been formed in corrugate plates 1 and the plain plates 3, and also, catalyst layers have been formed on inlet planes and rear planes of both the corrugate plates 1 and the flat planes 3. FIG. 16 is a perspective view for showing a major portion of the employed corrugate plate 1. A semi-filter-structured body has a volume of 2 L and a diameter of 130 mm. In the semi-filter-structured body, a total number of cells is equal to 200 pieces/inch², and a plurality of holes 20 each having a diameter of 0.2 mm have been pierced every 0.2 mm in both the corrugate plates 1 and the plain plates 3, respectively.

Also, a catalyst layer is constituted by alumina powder to which Pt has been carried, and is wash-coated by employing slurry, and thereafter, is sintered. The catalyst layer owns very fine holes, the averaged diameter of which is 10 μm. 150 g of this catalyst layer is formed per 1 liter of the semi-filter-structured body, and 2 g of Pt is carried per 1 liter of the base. Also, the diameter of the hole 20 is reduced by the catalyst layer to become approximately 100 μm.

This exhaust gas purifying apparatus is operated in a similar manner to the exhaust gas purifying apparatus of the embodiment 1. Furthermore, in the exhaust gas purifying apparatus of this embodiment 7, the holes 20 may function as a filter-bypassing portion, and also, may function as such a portion for collecting PMs and for oxidizing/burning the collected PMs.

While this exhaust gas purifying apparatus was mounted on the exhaust pipe of the diesel engine, a PM reducing ratio in an 11 Lap mode and an exhaust gas pressure loss in the post driving period were measured. The PM reducing ratio was calculated based upon the below-mentioned formula from a total PM amount ($P_0$) exhausted from the diesel engine, which has been previously known, while a PM amount ($P_1$) is measured which is contained in the exhaust gas which has passed through the exhaust gas purifying apparatus:

PM reducing ratio (%)=100×($P_0$-$P_1$)/$P_0$

As the exhaust gas pressure loss, a difference between pressure of gas pressure loss, a difference between pressure of gas which was entered to the exhaust gas purifying apparatus and pressure of gas which was derived from the exhaust gas purifying apparatus was measured when the diesel engine was driven over 1000 km in the 11 Lap mode. Measurement results are indicated in a table 2.

Embodiment 8

A structure of an exhaust gas purifying apparatus of this embodiment 8 is similar to that of the embodiment 7 except that the holes 20 were not formed in the corrugate plate 1. Similar to the embodiment 7, both a PM reducing ratio and an exhaust gas pressure loss were measured respectively as to also the exhaust gas purifying apparatus of this embodiment 8. Measurement results are indicated in the table 2.

Comparison Example 2

A structure of an exhaust gas purifying apparatus of this comparison example 2 is similar to that of the embodiment 7 except that the holes 20 were not formed in the corrugate plate 1, and a metal fiber mat having a thickness of 0.3 mm and a porosity of 80% was employed instead of the plain plate 3. Similar to the embodiment 7, both a PM reducing ratio and an exhaust gas pressure loss were measured respectively, while using the exhaust gas purifying apparatus of this comparison example 2. Measurement results are indicated in the table 2.

Comparison Example 3

A structure of an exhaust gas purifying apparatus of this comparison example 3 is similar to that of the embodiment 7 except that the holes 20 were not formed in the corrugate plate 1 and the plain plate 3. Similar to the embodiment 7, both a PM reducing ratio and an exhaust gas pressure loss were measured respectively, while using the exhaust gas purifying apparatus of this comparison example 3. Measurement results are indicated in the table 2.

Evaluation

TABLE 2

|  | PM reducing ratios (%) | exhaust gas pressure loss (Kpa) |
| --- | --- | --- |
| embodiment 7 | 55 | 10 |
| embodiment 8 | 50 | 8 |
| comparison example 2 | 40 | 15 |
| comparison example 3 | 5 | 12 |

The exhaust gas purifying apparatus of the embodiment 7 owns superior PM collecting performance, and also a lower exhaust gas pressure loss, as compared with those of the comparison example 2. This reason is caused by the effects as follows: In the embodiment 7, since the catalyst layers are formed on the corrugate plate 1 and the plain plate 3, which are made of the metal thin plate, the catalyst layers are uniformly formed, as compared with the comparison example 2, and also, Pt is uniformly distributed.

Also, the exhaust gas purifying apparatus of the embodiments 7 and 8 owns superior PM collecting performance, and also lower exhaust gas pressure losses, as compared with those of the comparison examples 2 and 3. This reason is caused by the effect as follows: such an effect achieved by forming the holes 20 may appear.

Embodiment 9

A structure of an exhaust gas purifying apparatus of this embodiment 9 is similar to that of the embodiment 7 except that the holes 20 were not formed in the corrugate plate 1; a forming amount of a catalyst layer was selected to be 200 g per 1 liter of the base; and in addition to Pt, 0.2 mol of Li, 0.1 mol of Ba, and 0.1 mol of K per 1 liter of the base were carried by the catalyst layer.

The exhaust gas purifying apparatus of the embodiment 9 was tested under such an endurance test held for 50 hours at a temperature of 700° C. After the endurance test, the exhaust gas purifying apparatus was mounted on an exhaust system of a diesel engine, and then, an $NO_x$ purifying ratio was measured under such a drive control condition that an engine revolution was 2900 rpm; a temperature of inlet gas was 300° C.; and light oil was injected for 0.1 second every time 10 seconds has passed in order that A/F became 14.2. Measurement results are indicated in a table 3.

Comparison Example 4

While a DPF made of cordierite was prepared which has a thickness of 0.3 mm and 200 cells/inch², a catalyst layer similar to that of the embodiment 9 was formed on this DPF. 20% of the entire, clogging cocks of the outer peripheral portion were removed in order that a PM collecting coefficient thereof may become equal to that of the embodiment 9.

Also, as to this exhaust gas purifying apparatus, an $NO_x$ purifying ratio was measured in a similar manner to that of the embodiment 9. Measurement results are indicated in the table 3.

TABLE 3

|  | $NO_x$ purifying ratios (%) |
| --- | --- |
| embodiment 9 | 90 |
| comparison example 4 | 70 |

As apparent from the table 3, the exhaust gas purifying apparatus of the embodiment 9 represents higher $NO_x$ purifying performance, as compared with that of the comparison example 4. This reason is caused by the following effects: That is, the corrugate plate 1 and the plain plate 3, which are made of the metal thin plates, are employed, and also, the exhaust gas purifying apparatus of the embodiment 9 owns a large number of filter-conducting portions. The following facts may be conceived in the exhaust gas purifying apparatus of the embodiment 9. That is, NO contained in the exhaust gas could be oxidized to become $NO_2$ in a higher efficiency by the catalyst layer formed in the filter-conducting portions, and then, the $NO_2$ could be solved in a higher efficiency by the $NO_x$ sorbing material. Furthermore, since the $NO_x$ sorbing material is not reacted with the exhaust gas purifying apparatus, the $NO_x$ sorbing material does not disappear, and thus, the $NO_x$ purifying ratio could be improved due to these mutual effects. Also, lowering of mechanical strengths can be avoided.

Embodiment 10

An structure of an exhaust gas purifying apparatus of this embodiment 10 is similar to the structure of the exhaust gas purifying apparatus of the embodiment 7, in which the exhaust gas inlet side of the exhaust gas purifying apparatus of the embodiment 7 is inverted so as to become an exhaust gas outlet side, the height of the intermediate hill portion 14 is made low, and the depth of the intermediate valley portion 12 is made shallow. The catalyst layer is not shown.

Figure 17:
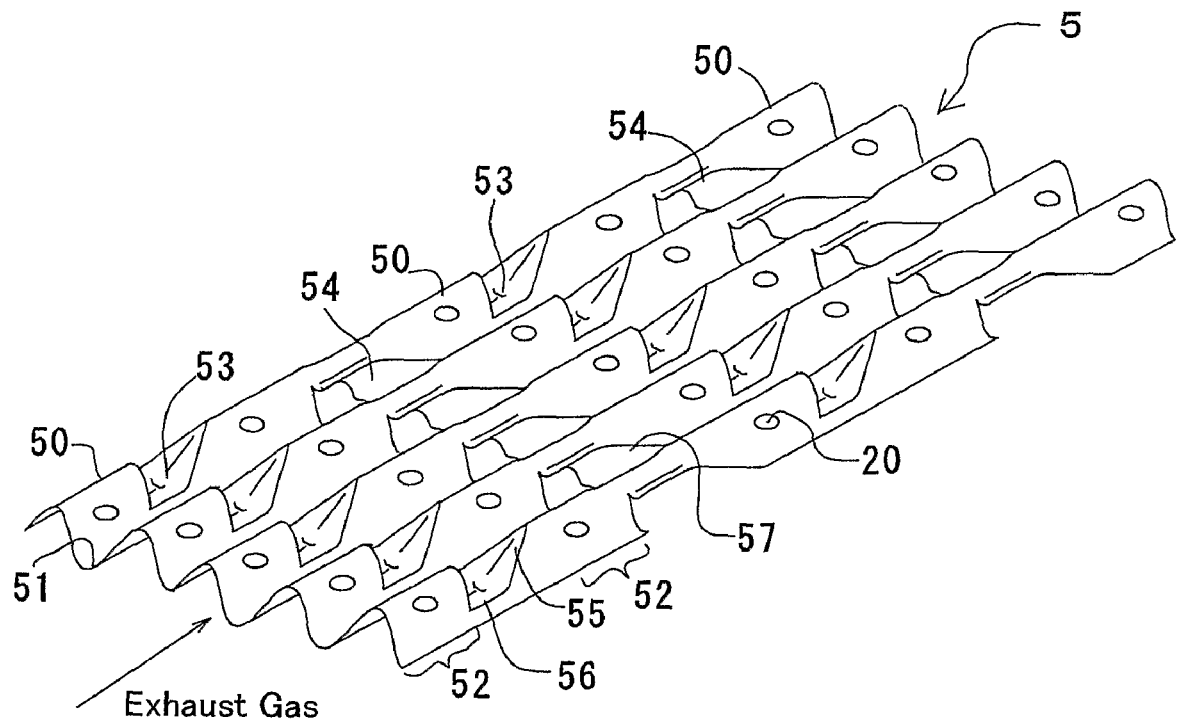
FIG. 17 is an enlarged perspective view for indicating a major portion of a corrugate plate employed in an exhaust gas purifying apparatus of an embodiment 10.

As to a corrugate plate 5 shown in FIG. 17, a hill/valley portion 52 in which a first hill portion 50 and a first valley portion 51 are alternately continued; a second valley portion 53 which is continued to the first hill portion 50 on the downstream side of the hill/valley portion 52; a second hill/valley portion 52 which is continued to the second valley portion 53; a second hill portion 54 which is continued to the first valley portion 51 on the downstream side of the second hill/valley portion 52; and a second valley portion 53 which is continued to the first hill portion 50 of the second hill/valley portion 52 on the downstream side of the second hill portion 54, have been alternately formed in this order in parallel to a flow direction of the exhaust gas. A height of an top portion of the second hill portion 54 is lower than a depth of a bottom portion of the first valley portion 51, whereas a depth of a bottom portion of the second valley portion 53 is shallower than a height of an top portion of the first hill portion 50.

The second valley portion 53 owns an inclination plane 55 which is upwardly inclined on the downstream side, and the inclination plane 55 is smoothly continued to the top portion of the next first hill portion 50. Also, side walls 56 which are extended along an upper direction of the drawing and whose heights are low have been formed on both sides of the second valley portion 53. Also, the second hill portion 54 owns an inclination plane 57 which is downwardly inclined on the downstream side, and the inclination plane 57 is smoothly continued to the bottom portion of the next first valley portion 51. Similar to the second valley portion 53, side walls 56 which are extended along a lower direction of the drawing have been formed on both sides of the second hill portion 54.

A plurality of the above-described corrugate plates 5 have been stacked with each other in such a manner that phases of the hill/valley portion 52, a group of the second valley portions 53, and a group of the second hill portions 54 are made equal to each other along both the exhaust gas flow direction and a direction perpendicular to this exhaust gas flow direction, and also, these plural corrugate plates 5 have been arranged in such a manner that the hill/valley portion 52, the group of the second valley portions 53, the group of the second hill portions 54 are located at the same positions respectively at such a sectional plane which is cut at a right angle with respect to the exhaust gas flow direction. Also, both the first hill portion 50 and the second hill portion 54 abut against the upper-side plain plates 3 respectively, whereas both the first valley portion 51 and the second valley portion 53 abut against the lower-side plain plates 3 respectively.

Figure 18:
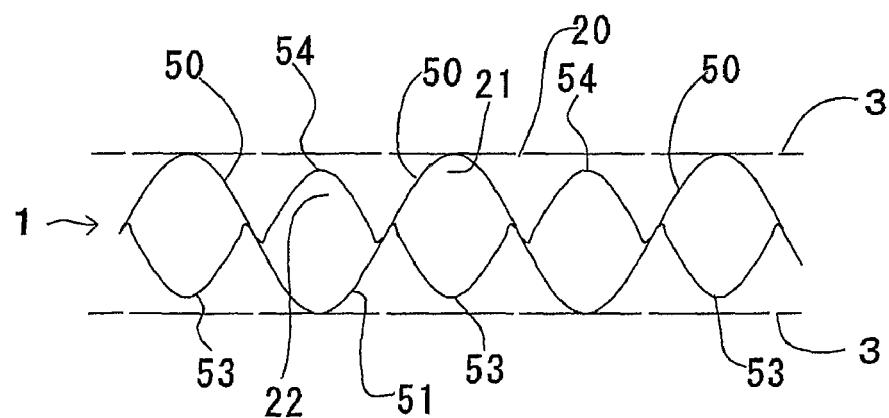
FIG. 18 is an enlarged perspective view for showing a major portion of the exhaust gas purifying apparatus of the embodiment 10.
Figure 19:
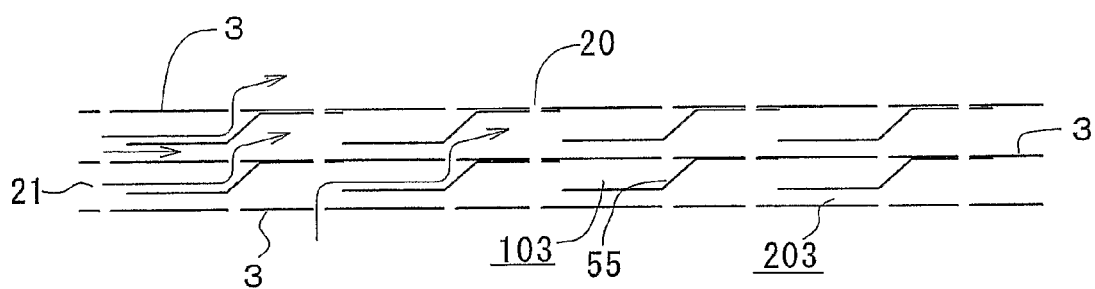
FIG. 19 is an enlarged perspective view for showing a major portion of the exhaust gas purifying apparatus of the embodiment 10.
Figure 20:
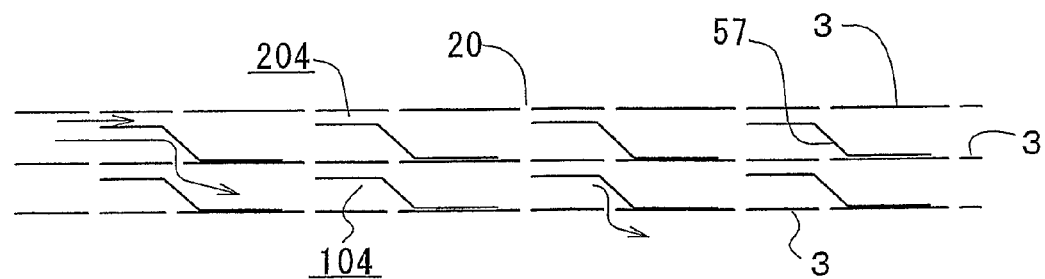
FIG. 20 is an enlarged perspective view for showing a major portion of the exhaust gas purifying apparatus of the embodiment 10.

As indicated in FIG. 18 to FIG. 20, in accordance with this exhaust gas purifying apparatus, most of the exhaust gas flowing through a first passage 21 formed between the first hill portion 50 and the lower-side plain plate 3 is entered into a first filter-conducting portion 103 formed between the second valley portion 53 and the upper-side plain plate 3. The exhaust gas entered into the first filter-conducting portion 103 is conducted to the side of the upper-side plain plate 3 in such a way that an edge plane of the downstream side is narrowed by the inclination plane 55 which is inclined toward the upper direction, and then, PMs are collected by the plain plate 3. The collected PMs are oxidized to be purified by the catalyst metals carried in the catalyst layer. Even in such a case that a PM collecting amount is increased, the exhaust gas can pass through a first filter detour portion 203 formed between the second valley portion 53 and the lower-side plain plate 3, so that the passages of the exhaust gas are not completely blocked. Also, the exhaust gas may pass through the holes 20 to both-side passages.

Similarly, most of the exhaust gas flowing through a second passage 22 formed between the first valley portion 51 and the upper-side plain plate 3 is entered into a second filter-conducting portion 104 formed between the second hill portion 54 and the lower-side plain plate 3. The exhaust gas entered into the second filter-conducting portion 104 is conducted to the side of the lower-side plain plate 3 in such a way that an edge plane of the downstream side is narrowed by the inclination plane 57 which is inclined toward the lower direction, and then, PMs are collected by the plain plate 3. The collected PMs are oxidized to be purified by the catalyst metals carried in the catalyst layer. Even in such a case that a PM collecting amount is increased, the exhaust gas can pass through a second filter detour portion 204 formed between the second hill portion 54 and the upper-side plain plate 3, so that the passages of the exhaust gas are not completely blocked.

Then, since a large number of filter-conducting portions have been formed, the PMs are uniformly distributed to be collected by the entire areas of the plain plates 3. As a result, the collecting efficiency can be improved, and even when the PMs are collected, the exhaust gas pressure loss can be hardly increased. In other words, the improvement in the PM collecting efficiency is compatible with the suppression in increasing of the exhaust gas pressure loss.

Furthermore, the exhaust gas collides with the inclination planes 55 and 57, NO becomes $NO_2$ having higher oxidizing activation by Pt carried in the catalyst layer, and then, the exhaust gas which contains this $NO_2$ passes through the plain plates 9 in the filter-conducting portions. As a consequence, the oxidation of the PMs collected by the plain plates 3 may be emphasized, and the exhaust gas pressure loss may be further lowered.

In this gas purifying apparatus, the filter-conducting portions 100 and 101 which have been blocked as explained in the embodiment 7 are not formed. However, since such a vector which is directed to a direction passing through the plain plates 3 is produced by force made by the collisions of the exhaust gas, most of the PMs can be collected by the plain plates 3. As a consequence, the improvement in the PM collecting efficiency is compatible with the suppression as to increasing of the exhaust gas pressure loss in this embodiment 10, although these effects are not so high, as compared with those of the embodiment 7, or the like.

Embodiment 11

Figure 21:
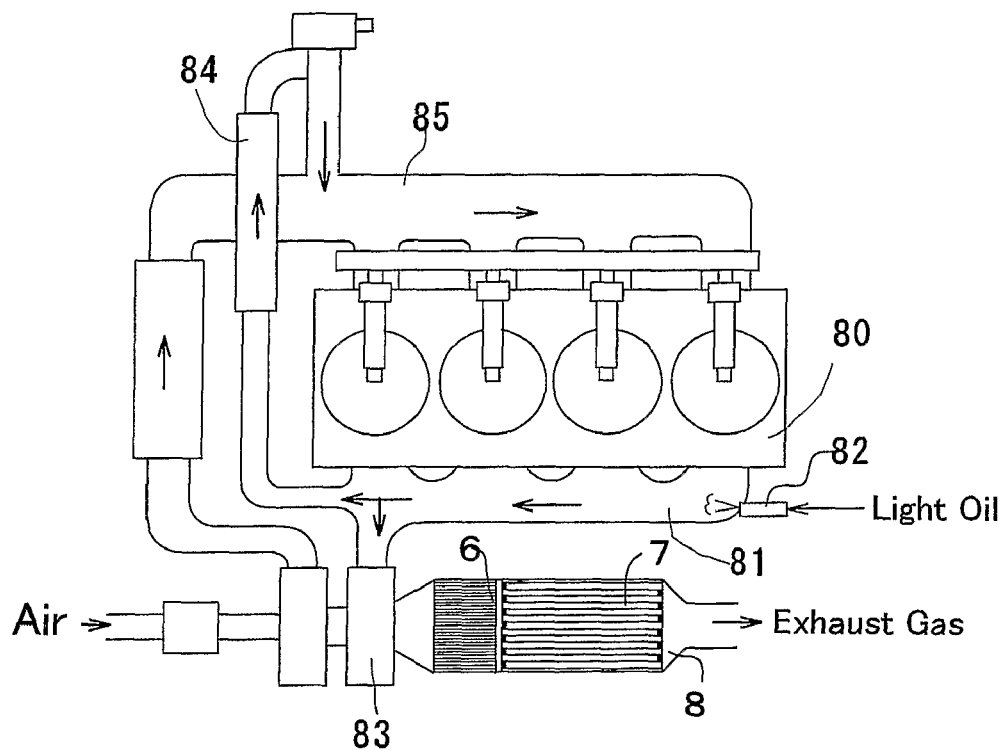
FIG. 21 is an explanatory diagram for showing an exhaust gas purifying apparatus of an embodiment 11.

FIG. 21 shows an exhaust gas purifying apparatus of this embodiment 11. This exhaust gas purifying apparatus is arranged in such a manner that a semi-filter-structured body 6 and filter catalyst 7 are located adjacent to each other in this order so as to be stored in a catalyst converter 8, while the semi-filter-structured body 6 and the filter catalyst 7 are directed from an upstream side of exhaust gas to a downstream side thereof. The catalyst converter 8 is coupled to an exhaust manifold 81 of a diesel engine 80. Also, an injection nozzle 82 is arranged in the exhaust manifold 81 in such a way that light oil may be intermittently injected into exhaust gas. It should be noted that a portion of the exhaust gas exhausted from the exhaust manifold 81 is returned via both a turbocharger 83 and an intercooler 84 to an intake manifold 85 of the diesel engine 80.

Figure 22:
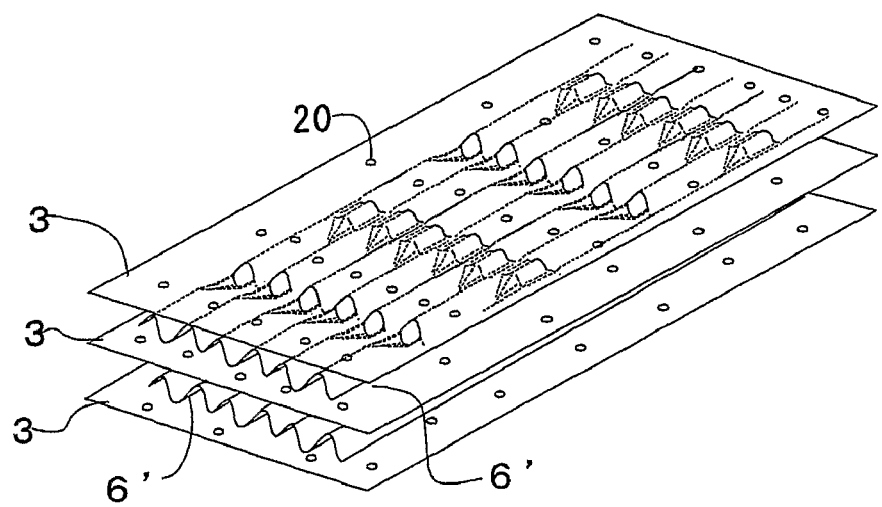
FIG. 22 is a perspective view for representing a major portion of a semi-filter-structured body employed in the exhaust gas purifying apparatus of the embodiment 11.

A structure of the semi-filter-structured body 6 is similar to that of the semi-filter-structured body of the embodiment 1 except that this semi-filter-structured body 6 owns holes 20 and an oxidizing catalyst layer. In the semi-filter-structured body 6, as shown in FIG. 22, corrugate plates 6' each having a thickness of 65 μm and plain plates 3 are alternately stacked with each other, the holes 20 have been formed in the plain plates 3 and flow through inlet and rear planes of the plain plates 3, and oxidizing catalyst layers (not shown) have been formed on the corrugate plates 6' and the plain plates 3. Also, a diameter of the hole 20 becomes approximately 200 μm by the oxidizing catalyst layer. The oxidizing catalyst layer (not shown) is formed by catalyst powder which is manufactured by that Pt is carried in γ-$Al_2O_3$, a coat amount per 1 L of a honeycomb structural body is 150 g, and a carry amount of Pt is 2 g.

Figure 23:
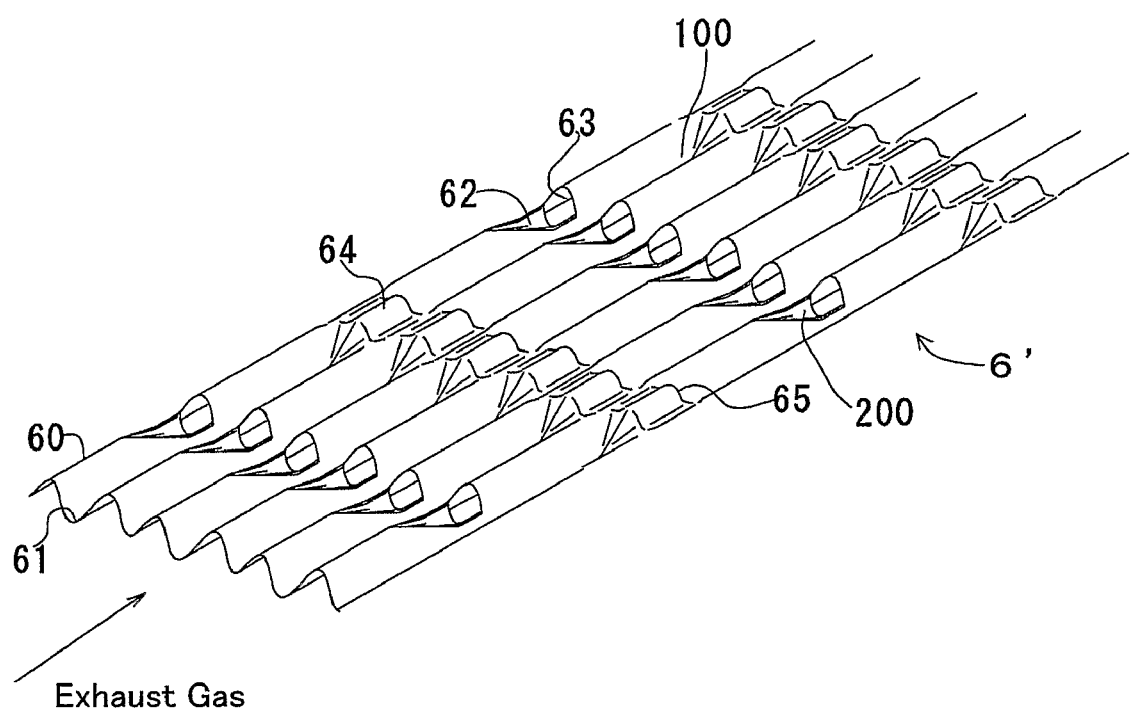
FIG. 23 is a perspective view for showing a major portion of a corrugate plate employed in the semi-filter-structured body in the embodiment 11.

In the corrugate plate 6' shown in FIG. 23, hill portions 60 and valley portions 61 are alternately continued to each other along a direction perpendicular to a flow direction of exhaust gas. In the hill portions 60, a plurality of intermediate valley portions 62 having concave shapes have been formed in such a manner that these intermediate valley portions 62 are mutually separated from each other in a certain internal, which are positioned parallel to the flow direction of the exhaust gas. Heights of the intermediate valley portions 62 are gradually lowered and directed from an upstream side of the exhaust gas to a downstream side of the exhaust gas, and tip portions of the intermediate valley portions 62 are notched, and then, openings 63 have been formed which are again communicated to the hill portions 60. Depths of bottom portions of the intermediate valley portions 62 are made coincident with positions of bottom portions of the valley portions 61.

Also, in the valley portion 61, a plurality of intermediate hill portions 64 having convex shapes have been formed in such a manner that these intermediate hill portions 64 are mutually separated from each other in a certain interval, which are positioned parallel to the flow direction of the exhaust gas. One intermediate hill portion 64 is arranged between two intermediate valley portions 62 along the exhaust gas flow direction, the height of which is made coincident with the height of the hill portion 60.

Figure 24:
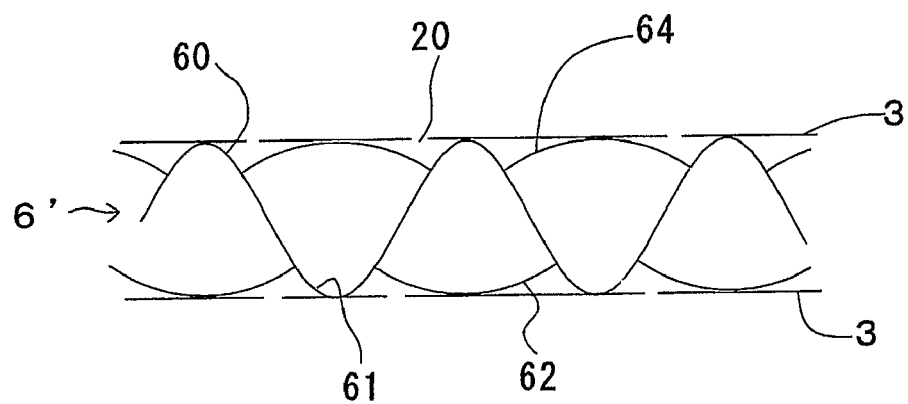
FIG. 24 is a perspective view for representing a major portion of a semi-filter-structured body employed in the exhaust gas purifying apparatus of the embodiment 11.
Figure 25:
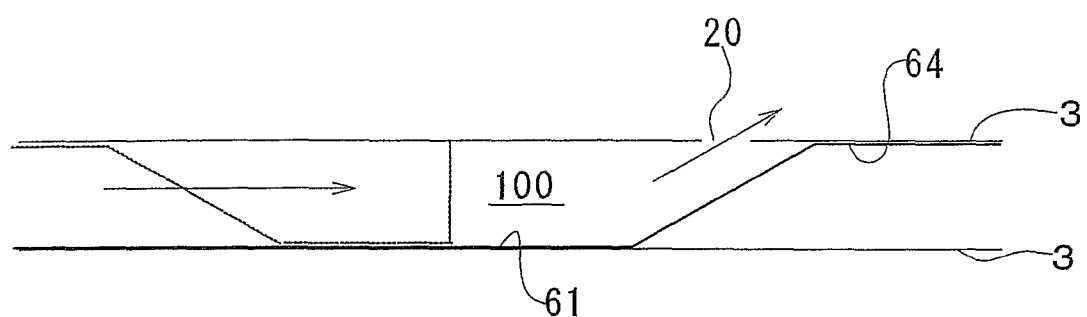
FIG. 25 is a perspective view for representing a major portion of a semi-filter-structured body employed in the exhaust gas purifying apparatus of the embodiment 11.

As also shown in FIG. 24, the plurality of corrugate plates 6' have been alternately stacked with each other in such a manner that phases of the intermediate valley portions 62 are identical to phase of the intermediate hill portions 64 along the exhaust gas flow direction, and along a direction perpendicular to the exhaust gas flow direction. Both the intermediate valley portions 62 and the intermediate hill portions 64 have been arranged in such a manner that in such a sectional plane that these intermediate valley and hill portions 62/64 are cut at a right angle with respect to the exhaust gas flow direction of the semi-filter-structured body 6, both the intermediate valley and hill portions 62/64 are located at the same positions, respectively. Also, the hill portion 60 abuts against the upper-side plain plate 3, whereas the valley portion 61 abuts against the lower-side plain plate 3. It should be noted that since FIG. 24 corresponds to a schematic diagram, spaces are present among the plain plate 3, the intermediate valley portion 62, and the intermediate hill portion 64. However, at the upstream-side edge plane, such a stacked construction is made by the hill portion 60, the valley portion 61, and the plain plate 3, and thus, no space is made. As a result, there is no problem.

As indicated in FIG. 25 to FIG. 28, in this semi-filter-structured body 6, a filter-conducting portion 100 has been formed on the inlet surface side of the corrugate plate 6', in which a passage has been blocked between the upper-side plain plate 3 and the both-side hill portions 60 located adjacent to the intermediate hill portion 64. Also, another filter-conducting portion 101 has been formed on the rear surface side of the corrugate plate 6', in which a passage has been blocked between the lower-side plain plate 3 and the both-side valley portions 61 located adjacent to the intermediate valley portion 62. Then, on the upstream side of the filter-conducting portion 100, the height of the hill portion 60 at the position of the intermediate valley portion 62 becomes low, and the opening 63 has been formed, so that the exhaust gas flowing through the valley portion 61 can be entered from the both-side openings 63 to the both-side hill portions 60, and a filter-bypassing portion 200 has been formed at this portion. Also, on the rear surface side, the depth of the valley portion 61 becomes shallow at the position of the intermediate hill portion 64 on the upstream side of the filter-conducting portion 101, and openings 65 have been formed, so that the exhaust gas flowing through the hill portion 60 can be entered from the both-side openings 65 to the both-side valley portions 61, and another detour portion 201 has been formed also at this portion.

As a consequence, as shown in FIG. 25 to FIG. 28, in accordance with the semi-filter-structured body 6 of this embodiment 11, the exhaust gas flowing through the passage which has been formed between the valley portion 61 and the upper-side plate 3 collides with the intermediate hill portion 64. Under such a condition that a PM collecting amount of the upper-side plain plate 3 is small, most of the exhaust gas flows through the upper-side plain plate 3, and then, is entered to the valley portion 61 of the corrugate plate 61 which is present on the opposite side of the plain plate 3, and thus, most of the PMs are collected by the plain plate 3.

Figure 26:
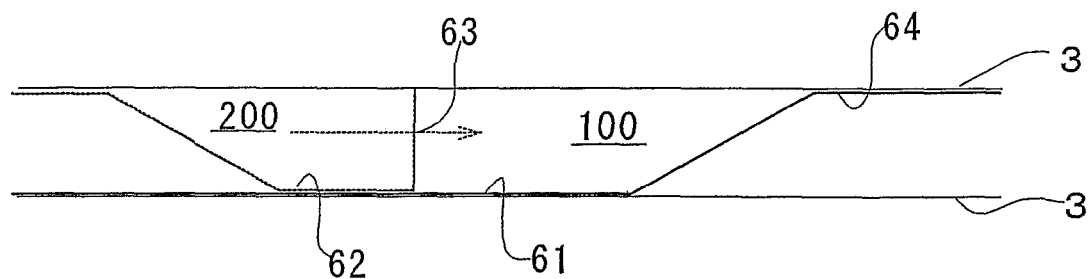
FIG. 26 is a perspective view for representing a major portion of a semi-filter-structured body employed in the exhaust gas purifying apparatus of the embodiment 11.

When the PM collecting amount is increased so that pressure of the exhaust gas in the filter-conducting portion 100 is increased, the exhaust gas flows from the intermediate valley portion 62, passes through the opening 63, and then, is branched to be entered into the adjoining hill portion 60 in the filter-bypassing portion 200 which is present on the upstream side, as indicated by a dot line of FIG. 26. As a consequence, an increase of an exhaust gas pressure loss may be suppressed.

Figure 27:
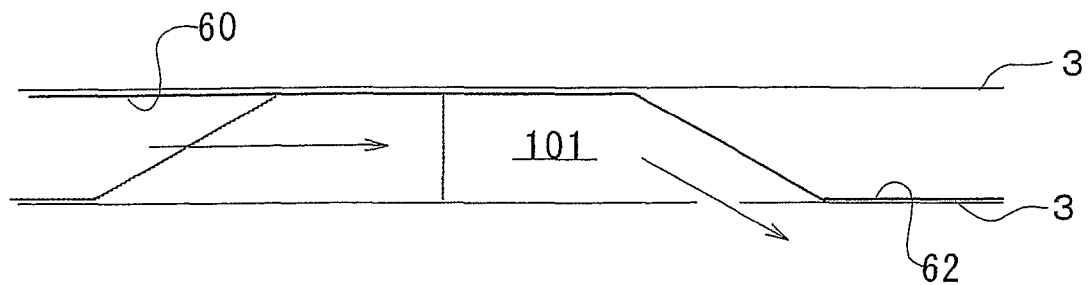
FIG. 27 is a perspective view for representing a major portion of a semi-filter-structured body employed in the exhaust gas purifying apparatus of the embodiment 11.

Similarly, as shown in FIG. 27, the exhaust gas flowing through the passage which has been formed between the hill portion 60 and the lower-side plate 3 collides with the intermediate valley portion 62. Under such a condition that a PM collecting amount of the lower-side plain plate 3 is small, most of the exhaust gas flows through the lower-side plain plate 3, and then, is entered to the valley portion 61 of the corrugate plate 6' which is present on the opposite side of the plain plate 3, and thus, most of the PMs are collected by the plain plate 3.

Figure 28:
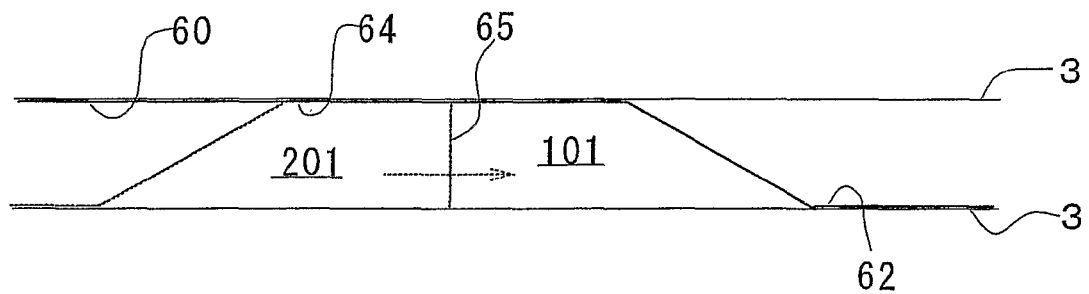
FIG. 28 is a perspective view for representing a major portion of a semi-filter-structured body employed in the exhaust gas purifying apparatus of the embodiment 11.

When the PM collecting amount is increased so that pressure of the exhaust gas in the filter-conducting portion 101 is increased, the exhaust gas flows from the intermediate hill portion 64, passes through the opening 65, and then, is branched to be entered into the valley portion 61 in the filter-bypassing portion 201 which is present on the upstream side, as indicated by a dot line of FIG. 28. As a consequence, an increase of an exhaust gas pressure loss may be suppressed.

In accordance with the semi-filter-structured body 6 of this embodiment 11, since the above-described cycle is continuously repeated from the edge plane of the exhaust gas inlet side toward the edge plane of the exhaust gas outlet side, the PMs are collected by the plain plate 3 in the filter-conducting portions 100 and 101. Then, since a large number of these filter-conducting portions 100 and 101 have been formed, the PMs are collected in such a manner that the PMs are uniformly distributed over the entire plain plate 3, so that the collecting efficiency may be improved, and even when the PMs are collected, the exhaust gas pressure loss can be hardly increased. In other words, the improvement in the PM collecting efficiency is compatible with the increase in the exhaust gas pressure loss.

Furthermore, in the semi-filter-structured body 6 of the exhaust gas purifying apparatus of this embodiment 11, an opening area of the corrugate plate 6', as viewed in a plane, in the filter-conducting portions 100 and 101 occupies approximately 40% of a total opening area of the corrugate plate 6', as viewed in the plane, whereas a total capacity of the filter-conducting portions 100 and 101 occupies approximately 50% of a total capacity of both the hill portions 60 and the valley portions 61. As a result, the utilizing area of the plain plates 3 is large, the PM collecting efficiency is high, and the increase in the exhaust gas pressure loss is suppressed.

Then, among the exhaust gas which passes through the semi-filter-structured body 6, exhaust gas passes through the holes 20 of the plain plate 3, and other exhaust gas is branched to, flow in a complex manner. Also, the diameters of the holes 20 are reduced by the oxidizing catalyst layers, and thus, a portion of the PMs can be collected by these reduced hole portions, so that filter-conducting portions have been formed also in these reduced hole portions. The collected PMs are oxidized/burned by the oxidizing catalyst layer. In other words, since the exhaust gas is branched in the complex manner, an agitating effect may be achieved, and thus, the light oil added in the exhaust gas is sufficiently mixed with the exhaust gas. Also, the oxidization of the light oil may be progressed by the oxidizing catalyst layer. As a result, gasification of the light oil may be progressed, so that such a difficulty may be suppressed, and consequently, the problem that the light oil adheres on the upstream-side edge plane of the filter catalyst 7, and the PMs adhere to the light oil and then are deposited thereon can be suppressed. Also, $NO_x$ reducing reaction may be progressed in the filter catalyst 7.

Next, a description is made of a method for manufacturing the filter catalyst 7, which may substitute a detailed explanation of the structure. First of all, a honeycomb structural body having a wall flow structure made of cordierite was prepared. This honeycomb structural body owns a volume of approximately 2 liters, and has 300 cells/inch$^2$ (namely, 46.5 cells/cm$^2$), and also, a cell wall of a thickness of 0.3 mm. A porosity of the cell wall is 65%, and an averaged diameter of pores is 25 μm. In this honeycomb structural body, outlet-side cells in which upstream-side edge planes thereof have been clogged and downstream-side edge planes thereof have not been clogged, and inlet-side cells in which downstream-side edge planes thereof have been clogged and upstream-side edge planes thereof have not been clogged are alternately arranged. The outlet-side cells and the inlet-side cells are partitioned by the cell wall.

Next, while mixed slurry was prepared in which each of alumina powder, titania powder, zirconia powder, and ceria powder have been distributed in water, coat layers of 150 g/L were formed on both the surface of the cell wall and the surfaces of the pores formed inside the cell wall of the above-explained honeycomb structural body by the wash coat method. Thereafter, Pt of 2 g/L was carried by the water absorption carrying method and was sintered. After Li of 0.3 mol/L, Ba of 0.05 mol/L, and K of 0.025 mol/L had been carried by the water absorption carrying method, the resultant honeycomb structural body was sintered at a temperature of 500° C. so as to manufacture the filter catalyst 7.

Examination

Both the semi-filter-structured body 6 and the filter catalyst 7 are arranged within the catalyst converter 8 in such a manner that the semi-filter-structured body 6 and the filter catalyst 7 are located adjacent to each other in this order from the exhaust gas upstream side to the exhaust gas downstream side, which constitutes the exhaust gas purifying apparatus of this embodiment 11. Then, the catalyst converter 8 was mounted on an exhaust system of a diesel engine 80 having a cubic capacity of 2 L, an endurance process operation was carried out for 50 hours at a temperature of 650° C., and thereafter, the diesel engine 80 was driven under revolution of 2900 rpm and an inlet gas temperature of 300° C. Then, the light oil was intermittently added from an injection nozzle 82 for 0.1 second every time 10 seconds have elapsed. An adjustment was made in order that A/F became 14.2 when the light oil was added.

Under this condition, both an $NO_x$ purifying ratio and a PM oxidizing ratio were measured. Also, as the reproducing process operation of the PM collecting performance, while exhaust gas of 300° C. was supplied, the light oil was continuously added from the injection nozzle 82 in order that A/F may become 2.5, and then, a reached maximum temperature of the filter catalyst 7 was measured. Measurement results are indicated in a table 4.

Embodiment 12

A structure of an exhaust gas purifying apparatus of this embodiment 12 is similar to that of the embodiment 11 except that a catalyst layer of a semi-filter-structured body 6 is formed from $NO_x$ sorbing-and-reducing catalyst which is similar to the catalyst layer of the filter catalyst 7 in the embodiment 11. After an endurance process operation had been carried out in a similar manner to that of the embodiment 11, both a $NO_x$ purifying ratio and a PM oxidizing ratio were measured in a similar manner. Also, a reached maximum temperature of the filter catalyst 7 was measured when a reproducing process operation was carried out. Measurement results are indicated in the table 4.

Embodiment 13

A structure of an exhaust gas purifying apparatus of this embodiment 13 is similar to that of the embodiment 11 except that a fiber mat made of a metal is employed instead of the plain plate 3 of the semi-filter-structured body 6, and a catalyst layer is formed from $NO_x$ sorbing-and-reducing catalyst which is similar to the catalyst layer of the filter catalyst 7 in the embodiment 11. After an endurance process operation had been carried out in a similar manner to that of the embodiment 11, both a $NO_x$ purifying ratio and a PM oxidizing ratio were measured in a similar manner. Also, a reached maximum temperature of the filter catalyst 7 was measured when a reproducing process operation was carried out. Measurement results are indicated in the table 4.

Comparison Example 5

A structure of an exhaust gas purifying apparatus of this comparison example 5 is similar to that of the embodiment 11 except that instead of the semi-filter-structured body 6, an oxidizing catalyst layer similar to that of the embodiment 11 has been formed on a metal honeycomb body having a straight flow structure in which the normal plain plates and the normal corrugate plates have been merely and alternately stacked with each other. After an endurance process operation had been carried, out in a similar manner to that of the embodiment 11, both a $NO_x$ purifying ratio and a PM oxidizing ratio were measured in a similar manner. Also, a reached maximum temperature of the filter catalyst 7 was measured when a reproducing process operation was carried out. Measurement results are indicated in the table 4.

Comparison Example 6

A structure of an exhaust gas purifying apparatus of this comparison example 6 is similar to that of the embodiment 11 except that instead of the semi-filter-structured body 6, such a metal honeycomb body having a straight flow structure is employed in which the normal plain plates and the normal corrugate plates have been merely and alternately stacked with each other, and a catalyst layer is formed on this metal honeycomb body, while this catalyst layer has been formed from $NO_x$ sorbing-and-reducing catalyst which is similar to the catalyst layer of the filter catalyst 7 in the embodiment 11. After an endurance process operation had been carried out in a similar manner to that of the embodiment 11, both a $NO_x$ purifying ratio and a PM oxidizing ratio were measured in a similar manner. Also, a reached maximum temperature of the filter catalyst 7 was measured when a reproducing process operation was carried out. Measurement results are indicated in the table 4.

Evaluation

TABLE 4

| | $NO_x$ purifying ratio (%) | PM oxidizing ratio (%) | reached maximum temperature(° C.) |
|---|---|---|---|
| embodiment 11 | 60 | 70 | 680 |
| embodiment 12 | 80 | 70 | 680 |
| embodiment 13 | 80 | 90 | 680 |
| comparison example 5 | 45 | 60 | 580 |
| comparison example 6 | 50 | 60 | 580 |

As apparent from the table 4, in the exhaust gas purifying apparatus of the respective embodiments, both the $NO_x$ purifying ratios and the PM oxidizing ratios are high, and also, the reached maximum temperatures are high, as compared with those of the comparison examples. This reason may be conceived as the below-mentioned effect: That is, since the agitating operation and the decomposing operation as to the light oil were effectively progressed in the semi-filter-structured body 6, the light oil could be effectively gasified, and the gasified light oil could be effectively mixed with the exhausted gas.

Embodiment 14

Figure 29:
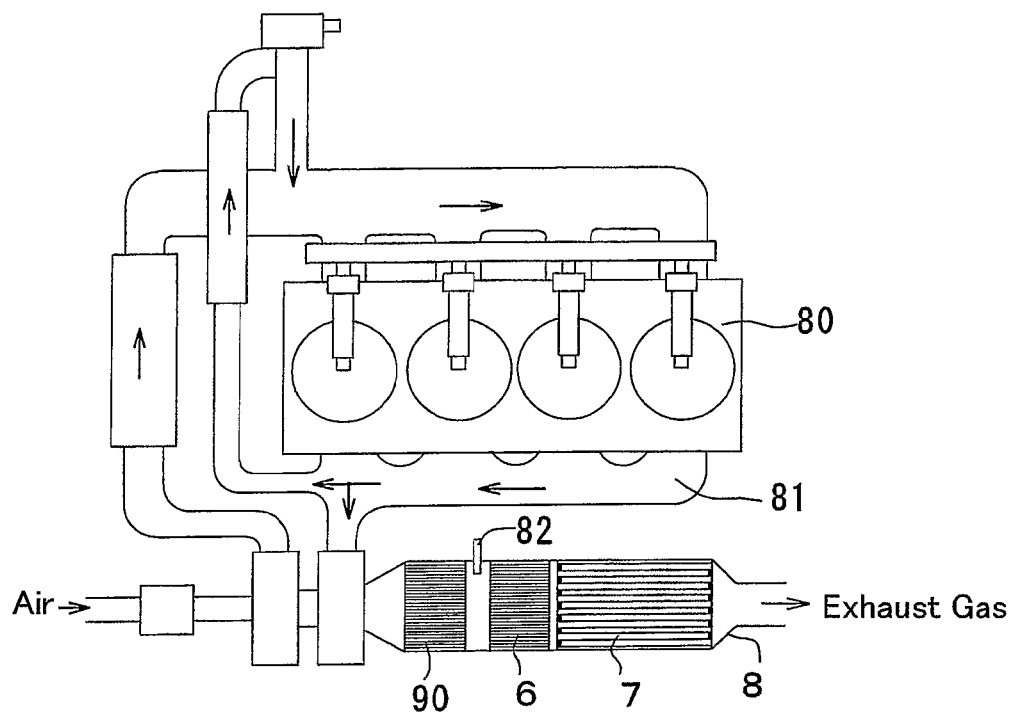
FIG. 29 is an explanatory diagram for showing an exhaust gas purifying apparatus of an embodiment 12.

FIG. 29 shows an exhaust gas purifying apparatus of this embodiment 14. This exhaust gas purifying apparatus is arranged in such a manner that an oxidizing catalyst 90 having a straight flow structure, a semi-filter-structured body 6, and filter catalyst 7 are located adjacent to each other in this order so as to be stored in a catalyst converter 8, while the oxidizing catalyst 90 having the straight flow structure, the semi-filter-structured body 6 and the filter catalyst 7 are directed from an upstream side of exhaust gas to a downstream side thereof. Also, while an injection nozzle is not provided in the exhaust manifold 81, a urea fluid injector 82 for adding a urea fluid is arranged between the catalyst oxide 90 and the semi-filter-structured body 6.

The oxidizing catalyst 90 is manufactured in such a manner that a coat layer of 150 g/L which mainly contains alumina and zeolite is formed on a honeycomb structural body (400 cells/inch$^2$, thickness of cell wall=0.1 mm, diameter=130 mm, and 2 L) having a straight flow structure made of cordierite, and then, Pt of 2 g/L is uniformly carried in the coat layer.

As to the semi-filter-structured body 6, such a semi-filter-structured body similar to that of the embodiment 11 was employed except that instead of the plain plate 61, a fiber mat made of a metal and having a porosity of 80% and a thickness of 0.3 mm was employed; a volume thereof was selected to be 1 L, 150 g/L of the urea-$NO_x$-selective-reducing catalyst layer made of zeolite in which Cu of 2 g/L is uniformly carried was formed.

As to the filter catalyst 7, 150 g/L of a coat layer made of zeolite has been formed on a honeycomb structural body having a wall flow structure made of cordierite, which is similar to that of the embodiment 11; and a urea-$NO_x$-selective-reducing catalyst layer has been formed on this catalyst layer, in which Cu of 2 g/L is uniformly carried.

Examination

While the catalyst converter 60 was mounted on an exhaust system of a diesel engine 80 having a cubic capacity of 2 L, both a $NO_x$ purifying ratio and a PM reducing ratio were measured in accordance with the following manners. That is, an endurance process operation was carried out for 50 hours at a temperature of 650° C., and thereafter, the diesel engine 80 was set to respective stationary states under revolution of 2500 rpm and temperatures of inlet gas from 250° C. to 400° C. While exhaust gas was distributed under the respective conditions and a urea fluid having concentration of 35% was added from the urea fluid injector 82 to the exhaust gas in such a manner that the added urea fluid became equivalent to $NO_x$ contained in the inlet gas, the diesel engine 80 was driven for 3 hours so as to measure the $NO_x$ purifying ratios and the PM reducing ratios. Also, thereafter, the urea fluid was injected as a post injection of the urea fluid in such a manner that an outlet gas temperature of the oxidizing catalyst 90 may become 650° C. at the inlet gas temperature of 300° C., and then, a PM oxidizing ratio after 3 minutes when the temperature started to be increased was measured. Measurement results are represented in a table 5.

Embodiment 15

A structure of an exhaust gas purifying apparatus of this embodiment 15 is similar to that of the embodiment 14 except that as a honeycomb structural body of the oxidizing catalyst 90, a fiber mat of a semi-filter-structured body 6 is employed instead of the plain plate 61 of the embodiment 11 and the volume is made of 1.5 L. Then, a $NO_x$ purifying ratio, a PM reducing ratio, and a PM oxidizing ratio were measured in a similar manner, and measurement results are indicated in the table 5.

Comparison Example 7

Figure 30:
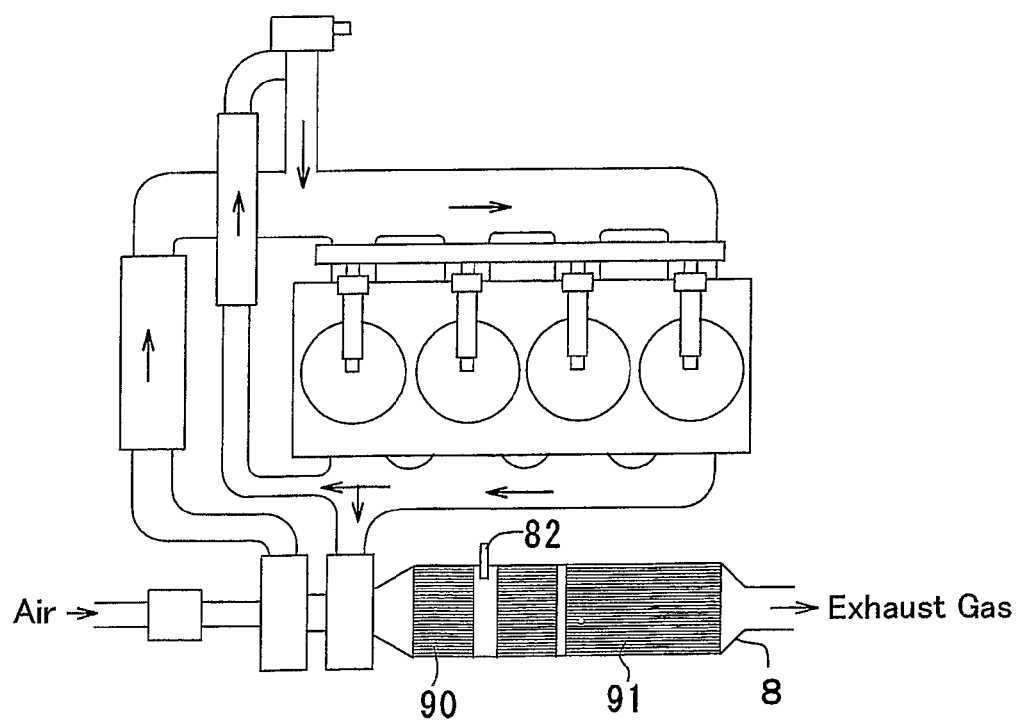
FIG. 30 is an explanatory diagram for showing an exhaust gas purifying apparatus of a comparison example 7.

As indicated in FIG. 30, a structure of an exhaust gas purifying apparatus of this comparison example 7 is similar to that of the embodiment 14 except that instead of the semi-filter-structured body 6, a honeycomb base having a straight flow structure made of cordierite and a volume of 1 L; and instead of the filter catalyst 7, such a urea-$NO_x$-selective-reducing catalyst 91 is employed. In this urea-$NO_x$-selective-reducing catalyst 91, a coat layer of 150 g/L which is made of zeolite is formed on a honeycomb base having a straight flow structure made of cordierite and a volume of 2 L, and then Cu of 2 g/L is uniformly carried. Then, a $NO_x$ purifying ratio and PM reducing ratio were measured in a similar manner, and measurement results are indicated in the table 5.

Comparison Example 8

Figure 31:
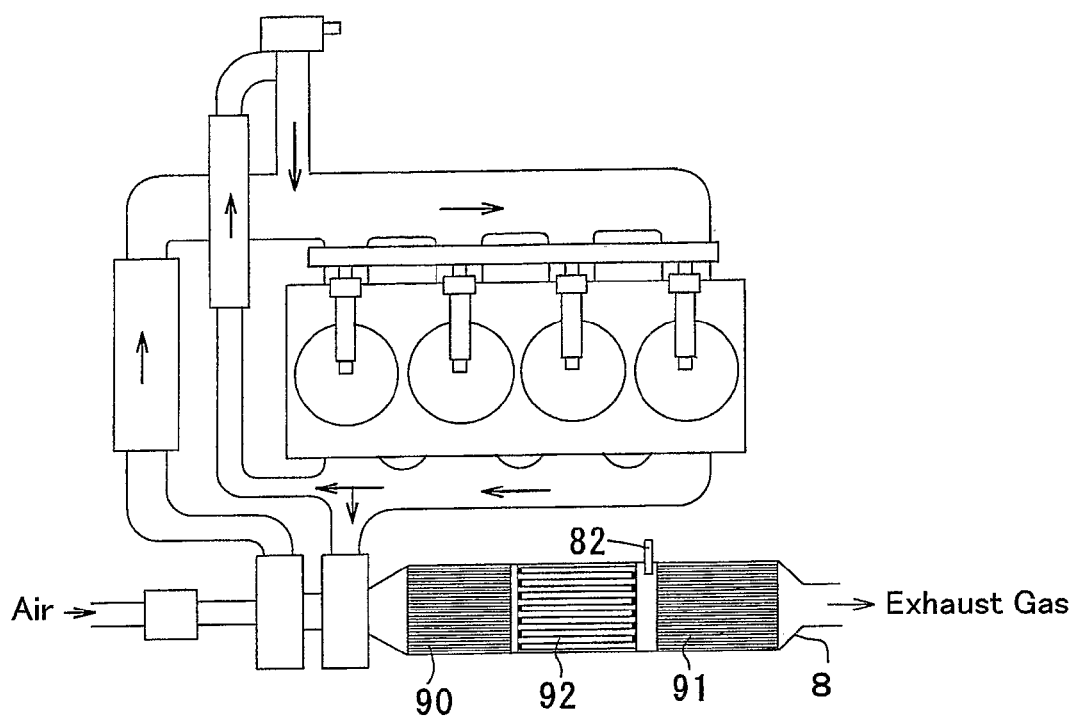
FIG. 31 is an explanatory diagram for showing an exhaust gas purifying apparatus of a comparison example 8.

As indicated in FIG. 31, a structure of an exhaust gas purifying apparatus of this comparison example 8 is similar to that of the embodiment 14 except that a volume of the oxidizing catalyst 90 is made of 1 L; the filter catalyst 92 in which alumina of 100 g/L is coated on a DPF made of cordierite and having a volume of 2 L, Pt of 0.5/L is uniformly carried is employed in place of the semi-filter-structured body 6. Then, a $NO_x$ purifying ratio, a PM reducing ratio, and a PM oxidizing ratio were measured in a similar manner, and measurement results are indicated in the table 5.

Comparison Example 9

Figure 32:
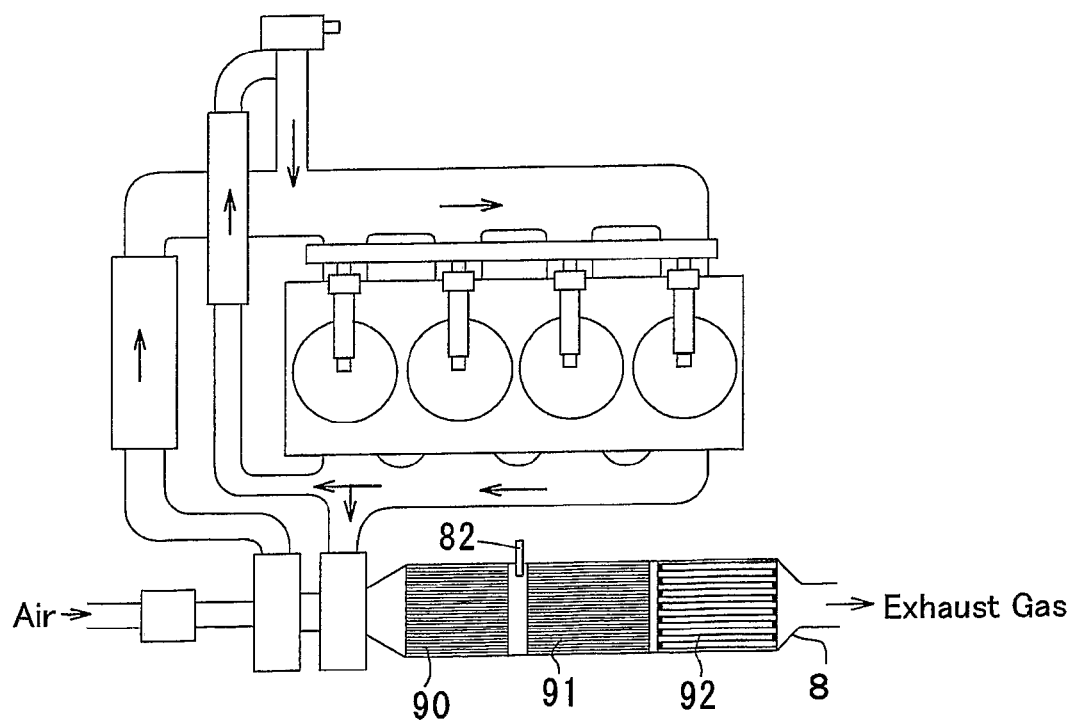
FIG. 32 is an explanatory diagram for showing an exhaust gas purifying apparatus of a comparison example 9.

As indicated in FIG. 32, a structure of an exhaust gas purifying apparatus of this comparison example 9 is similar to that of the comparison example 8 except that the position of the Urea-$NO_x$ selective reducing catalyst 91 is replaced by the position of the filter catalyst 92, and furthermore, a urea fluid injector 82 is arranged between the oxidizing catalyst 90 and the Urea-$NO_x$ selective reducing catalyst 91. Then, a $NO_x$ purifying ratio, a PM reducing ratio, and a PM oxidizing ratio were measured in a similar manner, and measurement results are indicated in the table 5.

Evaluation

TABLE 5

|  | $NO_x$ purifying ratio (%) | | | PM reducing ratio (%) | PM oxidizing ratio (%) for 3 minutes after temperature increase |
| --- | --- | --- | --- | --- | --- |
|  | 250° C. | 300° C. | 400° C. | 400° C. |  |
| embodiment 14 | 82 | 92 | 94 | 98 | 90 |
| embodiment 15 | 80 | 94 | 96 | 98 | 95 |
| comparison example 7 | 52 | 72 | 75 | 15 | — |
| comparison example 8 | 43 | 65 | 72 | 90 | 70 |
| comparison example 9 | 38 | 58 | 66 | 90 | 40 |

As apparent from the table 5, in the exhaust gas purifying apparatus of the respective embodiments, both the $NO_x$ purifying ratios and the PM reducing ratios are high, and the PM oxidizing ratios are also high, as compared with those of the comparison examples. This reason may be conceived as follows: That is, the PMs were collected by the semi-filter-structured body 6, and also, the urea fluid was mixed with the exhaust gas in a higher efficiency, and $NO_x$ could be effectively reduced/purified by ammonia which was produced.

The invention claimed is:

1. An exhaust gas purifying apparatus comprising a semi-filter-structured body comprising a plurality of exhaust gas passages, and a filter body provided in the exhaust gas passages, wherein:
   the exhaust gas passages comprise a filter-conducting portion, which conducts an exhaust gas to the filter body, and a filter-bypassing portion, which bypasses the filter-conducting portion by branching out to an exhaust gas passage adjacent to the filter-conducting portion;
   a most upstream filter-bypassing portion is provided more upstream than a most upstream filter-conducting portion, and the exhaust gas passage of the most upstream filter-bypassing portion is open at an exhaust gas inlet side of the semi-filter-structured body;
   the semi-filter-structured body is defined by a thin metal corrugate plate having hill portions and valley portions alternately neighboring each other in a direction crossing an exhaust gas flow direction and a gas transmittable plain plate comprising the filter body, the corrugate plate and the plain plate being alternately stacked;
   a wall-flow-structured filter catalyst comprising an inlet-side cell clogged on a downstream part thereof;
   an outlet-side cell neighboring the inlet-side cell and clogged on an upstream part thereof;
   a cell wall demarcating the inlet-side cell and the outlet-side cell and having a number of pores;
   a catalyst layer formed on a surface of the cell wall and an inner face of the pores and comprising a catalyst metal and an oxide support; and
   the wall-flow-structured filter catalyst is disposed more downstream than the semi-filter-structured body.

2. An exhaust gas purifying apparatus as claimed in claim 1 wherein:
   the semi-filter-structured body comprises an oxidizing catalyst layer comprising an oxidizing catalyst and an oxide support.

3. An exhaust gas purifying apparatus as claimed in claim 1, further comprising a reducing agent adding device of adding a reducing agent into the exhaust gas more upstream than the semi-filter-structured body.

4. An exhaust gas purifying apparatus as claimed in claim 1 wherein:
   the catalyst layer of the filter catalyst comprises a $NO_x$ sorbing-and-reducing catalyst.

5. An exhaust gas purifying apparatus as claimed in claim 1 wherein:
   the catalyst layer of the filter catalyst comprises a urea-$NO_x$-selective-reducing catalyst, and a urea adding device of adding a urea into the exhaust gas more upstream than the semi-filter-structured body.

6. An exhaust gas purifying apparatus comprising a semi-filter-structured body comprising a plurality of exhaust gas passages, and a filter body provided in the exhaust gas passages, wherein:
   the exhaust gas passages comprise a filter-conducting portion, which conducts an exhaust gas to the filter body, and a filter-bypassing portion, which bypasses the filter-conducting portion by branching out to an exhaust gas passage adjacent to the filter-conducting portion;
   a most upstream filter-bypassing portion is provided more upstream than a most upstream filter-conducting portion, and the exhaust gas passage of the most upstream filter-bypassing portion is open at an exhaust gas inlet side of the semi-filter-structured body;
   the semi-filter-structured body is defined by a thin metal corrugate plate having hill portions and valley portions alternately neighboring each other in a direction crossing an exhaust gas flow direction and a gas transmittable plain plate comprising the filter body, the corrugate plate and the plain plate being alternately stacked;

the hill portions include a concave intermediate valley portion defined by decreasing a height of part of the hill portions;

the intermediate valley portion defines the filter-bypassing portion, and comprises a branching portion that enables the exhaust gas to flow from a neighboring valley portion and an opening that enables the exhaust gas to flow in a downstream hill portion;

the valley portions include a convex intermediate hill portion defined by decreasing a depth of part of the valley portions;

the filter-conducting portion is defined by the intermediate hill portion, both of the hill portions adjacent to the valley portion, and the plain plate contacting the hill portions; and in the case that a pressure in the filter-conducting portion is increased, at least a part of the exhaust gas flowing on the valley portion flows in a neighboring hill portion through the branching portion.

7. An exhaust gas purifying apparatus as claimed in claim 6 wherein:
the hill portion is opposite the filter-conducting portion through the plain plate.

8. An exhaust gas purifying apparatus as claimed in claim 6 wherein:
the intermediate hill portion is formed by deforming a part of the valley portion, and a height of a hill of the intermediate hill portion gradually decreases toward an upstream end thereof.

9. An exhaust gas purifying apparatus as claimed in claim 6 wherein:
an open area of the corrugate plate in the filter-conducting portions estimated by a plan view is more than or equal to 30% of a total open area of the corrugate plate estimated by a plan view.

10. An exhaust gas purifying apparatus as claimed in claim 6 wherein:
a total volume of the filter-conducting portions is more than or equal to 50% of a total volume of the hill portions and the valley portions.

11. An exhaust gas purifying apparatus as claimed in claim 6 wherein:
at least the plain plate among the plain plate and the corrugate plate comprises a hole passing from a side to another side, and a catalyst layer comprising a catalyst metal and a porous oxide; and
the hole is shrunk or filled up by the catalyst layer to be less than or equal to 200 μm.

12. An exhaust gas purifying apparatus as claimed in claim 11 wherein:
the hill portion is opposite the filter-conducting portion through the plain plate.

13. An exhaust gas purifying apparatus as claimed in claim 6 wherein:
the most upstream filter-bypassing portion comprises a valley portion having a turned intermediate hill portion that is open at an upstream side thereof;
a height of a hill of the turned intermediate hill portion gradually decreases in a downstream direction; and
the turned intermediate hill portion continues to a downstream valley portion.

14. An exhaust gas purifying apparatus as claimed in claim 6 wherein:
the most upstream filter-bypassing portion is defined by a hole that a particulate matter in the exhaust gas is able to pass through; and
the hole is formed on the plain plate stacked beneath the corrugate plate and is opposite the hill portion of the corrugate plate.

15. An exhaust gas purifying apparatus comprising a semi-filter-structured body comprising a plurality of exhaust gas passages, and a filter body provided in the exhaust gas passages, wherein:
the exhaust gas passages comprise a filter-conducting portion, which conducts an exhaust gas to the filter body, and a filter-bypassing portion, which bypasses the filter-conducting portion by branching out to an exhaust gas passage adjacent to the filter-conducting portion;
a most upstream filter-bypassing portion is provided more upstream than a most upstream filter-conducting portion, and the exhaust gas passage of the most upstream filter-bypassing portion is open at an exhaust gas inlet side of the semi-filter-structured body;
the semi-filter-structured body is defined by a thin metal corrugate plate having hill portions and valley portions alternately neighboring each other in a direction crossing an exhaust gas flow direction and a gas transmittable plain plate comprising the filter body, the corrugate plate and the plain plate being alternately stacked;
the filter body comprises a hole passing from a side to another side, and a catalyst layer comprising a catalyst metal, and a porous oxide;
the hole is shrunk or filled up by the catalyst layer to be less than or equal to 200 μm;
the corrugate plate further comprises:
a first hill portion and a first valley portion alternately neighboring each other;
a first passage defined by the first hill portion and the plain plate beneath the corrugate plate;
a first filter-conducting portion defined by a second valley portion that is formed on the first passage and inclines upward along a downstream direction and the plain plate above the corrugate plate;
a first filter-bypassing portion defined by the second valley portion and the plain plate beneath the corrugate plate;
a second passage defined by the first valley portion neighboring the first passage and the plain plate above the corrugate plate;
a second filter-conducting portion defined by a second hill portion that is formed on the second passage and inclines downward along a downstream direction and the plain plate beneath the corrugate plate;
a second filter-bypassing portion defined by the second hill portion and the plain plate above the corrugate plate; and
a depth of a bottom of the second valley portion is smaller than a height of a top of the first hill portion; and a height of a top of the second hill portion is smaller than a depth of a bottom of the first valley portion.

16. An exhaust gas purifying apparatus as claimed in claim 15 wherein:
the semi-filter-structured body further comprises at least one of an opening that an exhaust gas is able to flow from the first filter-conducting portion to the second passage and an opening that an exhaust gas is able to flow from the second filter-conducting portion to the first passage.

17. An exhaust gas purifying apparatus comprising a semi-filter-structured body comprising a plurality of exhaust gas passages, and a filter body provided in the exhaust gas passages, wherein:

the exhaust gas passages comprise a filter-conducting portion, which conducts an exhaust gas to the filter body, and a filter-bypassing portion, which bypasses the filter-conducting portion by branching out to an exhaust gas passage adjacent to the filter-conducting portion;

a most upstream filter-bypassing portion is provided more upstream than a most upstream filter-conducting portion, and the exhaust gas passage of the most upstream filter-bypassing portion is open at an exhaust gas inlet side of the semi-filter-structured body;

the semi-filter-structured body is defined by a thin metal corrugate plate having hill portions and valley portions alternately neighboring each other in a direction crossing an exhaust gas flow direction and a gas transmittable plain plate comprising the filter body, the corrugate plate and the plain plate being alternately stacked;

the valley portions include a convex intermediate hill portion defined by decreasing a depth of part of the valley portions;

the intermediate hill portion defines the filter-bypassing portion, and comprises a branching portion that enables the exhaust gas to flow from a neighboring hill portion and an opening that enables the exhaust gas to flow in a downstream valley portion;

the hill portions include a concave intermediate valley portion defined by decreasing a height of part of the hill portions;

the filter-conducting portion is defined by the intermediate valley portion, both of the valley portions adjacent to the hill portion, and the plain plate contacting the valley portions; and in the case that a pressure in the filter-conducting portion is increased, at least a part of the exhaust gas flowing on the hill portion flows in a neighboring valley portion through the branching portion.

18. An exhaust gas purifying apparatus as claimed in claim 17 wherein:

the valley portion is opposite the filter-conducting portion through the plain plate.

19. An exhaust gas purifying apparatus as claimed in claim 17 wherein:

the intermediate valley portion is formed by deforming a part of the hill portion, and a depth of a valley of the intermediate valley portion gradually decreases toward a downstream end thereof.

20. An exhaust gas purifying apparatus as claimed in claim 17 wherein:

an open area of the corrugate plate in the filter-conducting portions estimated by a plan view is more than or equal to 30% of a total open area of the corrugate plate estimated by a plan view.

21. An exhaust gas purifying apparatus as claimed in claim 17 wherein:

a total volume of the filter-conducting portions is more than or equal to 50% of a total volume of the hill portions and the valley portions.

22. An exhaust gas purifying apparatus as claimed in claim 17 wherein:

at least the plain plate among the plain plate and the corrugate plate comprises a hole passing from a side to another side, and a catalyst layer comprising a catalyst metal, and a porous oxide; and the hole is shrunk or filled up by the catalyst layer to be less than or equal to 200 μm.

23. An exhaust gas purifying apparatus as claimed in claim 22 wherein:

the valley portion is opposite the filter-conducting portion through the plain plate.

24. An exhaust gas purifying apparatus as claimed in claim 17 wherein:

the most upstream filter-bypassing portion comprises a valley portion having a turned intermediate hill portion that is open at an upstream side thereof;

a height of a hill of the turned intermediate hill portion gradually decreases in a downstream direction; and the turned intermediate hill portion continues to a downstream valley portion.

25. An exhaust gas purifying apparatus as claimed in claim 17 wherein:

the most upstream filter-bypassing portion is defined by a hole that a particulate matter in the exhaust gas is able to pass through; and the hole is formed on the plain plate stacked beneath the corrugate plate and is opposite the hill portion of the corrugate plate.

26. An exhaust gas purifying apparatus as claimed in claim 17 wherein:

the most upstream filter-bypassing portion is defined by a notch that a particulate matter in the exhaust gas is able to pass through; and the notch is formed on the plain plate stacked beneath the corrugate plate and is opposite the hill portion of the corrugate plate.

* * * * *